US012645389B2

(12) United States Patent
Kim et al.

(10) Patent No.: US 12,645,389 B2
(45) Date of Patent: Jun. 2, 2026

(54) COMPUTATIONAL STORAGE DEVICE FOR DEEP-LEARNING RECOMMENDATION SYSTEM AND METHOD OF OPERATING THE SAME

(71) Applicant: SAMSUNG ELECTRONICS CO., LTD., Suwon-si (KR)

(72) Inventors: Minho Kim, Seongnam-si (KR); Wijik Lee, Suwon-si (KR); Sooyoung Ji, Seoul (KR); Sanghwa Jin, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 993 days.

(21) Appl. No.: 17/664,905

(22) Filed: May 25, 2022

(65) Prior Publication Data

US 2023/0102226 A1      Mar. 30, 2023

(30) Foreign Application Priority Data

Sep. 28, 2021    (KR) ........................ 10-2021-0128011

(51) Int. Cl.
    *G06F 3/06*          (2006.01)
    *G06N 3/08*          (2023.01)
(52) U.S. Cl.
    CPC .......... *G06F 3/0655* (2013.01); *G06F 3/0604* (2013.01); *G06F 3/0679* (2013.01); *G06N 3/08* (2013.01)
(58) Field of Classification Search
    CPC .................................................... G06F 3/0655

(Continued)

(56) References Cited

U.S. PATENT DOCUMENTS

| | | | |
|---|---|---|---|
| 7,930,322 | B2 | 4/2011 | MaClennan |
| 10,963,503 | B2 | 3/2021 | Skiles et al. |

(Continued)

FOREIGN PATENT DOCUMENTS

| | | |
|---|---|---|
| CN | 112114968 A | 12/2020 |
| JP | 2013-228933 | 11/2013 |

(Continued)

OTHER PUBLICATIONS

What is NVMe and Why is it Important, by Gupta, https://blog.westerndigital.com/nvme-important-data-driven-businesses/ (Year: 2020).*

(Continued)

*Primary Examiner* — Austin Hicks
(74) *Attorney, Agent, or Firm* — Morgan, Lewis & Bockius LLP

(57)          ABSTRACT

A computational storage device includes a nonvolatile memory configured to store a plurality of embedding tables for a deep-learning recommendation system (DLRS), and a storage controller configured to control an operation of the nonvolatile memory, store a plurality of applications that are off-loaded from a host device executing the DLRS, and support an execution of the DLRS by executing the plurality of applications and performing a plurality of calculations based on the plurality of embedding tables. The storage controller includes a machine learning engine configured to determine a management scheme of at least one embedding table of the plurality of embedding tables and the plurality of applications by analyzing the at least one embedding table and the plurality of applications.

20 Claims, 20 Drawing Sheets

(58) Field of Classification Search
USPC ......................................................... 706/12
See application file for complete search history.

(56) References Cited

U.S. PATENT DOCUMENTS

| | | | |
|---|---|---|---|
| 10,984,337 B2 | 4/2021 | Bai et al. | |
| 10,984,344 B2 | 4/2021 | Yamaguchi et al. | |
| 2018/0204113 A1 | 7/2018 | Galron et al. | |
| 2019/0065486 A1* | 2/2019 | Lin ........................ | G06N 3/044 |
| 2019/0391976 A1 | 12/2019 | Tsai et al. | |
| 2020/0089769 A1 | 3/2020 | Crossley et al. | |
| 2020/0401344 A1* | 12/2020 | Bazarsky .................. | G06T 5/70 |
| 2021/0150338 A1 | 5/2021 | Semenov | |
| 2021/0264220 A1 | 8/2021 | Wei et al. | |
| 2021/0383067 A1* | 12/2021 | Reisswig .............. | G06F 16/355 |
| 2022/0172825 A1* | 6/2022 | Bhagalia ................. | H04L 67/34 |

FOREIGN PATENT DOCUMENTS

| | | |
|---|---|---|
| JP | 2014-112283 | 6/2014 |
| KR | 10-1629178 | 6/2016 |

OTHER PUBLICATIONS

Compute Express Link: A Coherent Interface for Ultra-High-Speed Transfers, Kurt Lender, https://www.dmtf.org/sites/default/files/CXL_Overview_Virtual_DMTF_APTS_July_2020.pdf (Year: 2020).*

Attention in Recommendation Systems, Lee (Year: 2020).*

Monolith: Real Time Recommendation System With Collisionless Embedding Table, Liu et al., Sep. 27, 2022 (Year: 2022).*

Yao, et al., "K-SVM: An Effective SVM Algorithm Based on K-means Clustering", Journal of Computers, vol. 8, No. 10, Oct. 2013, pp. 2632-2639.

Office Action dated May 29, 2025 issued in corresponding Korean Patent Application No. 10-2021-0128011.

* cited by examiner

FIG. 8B
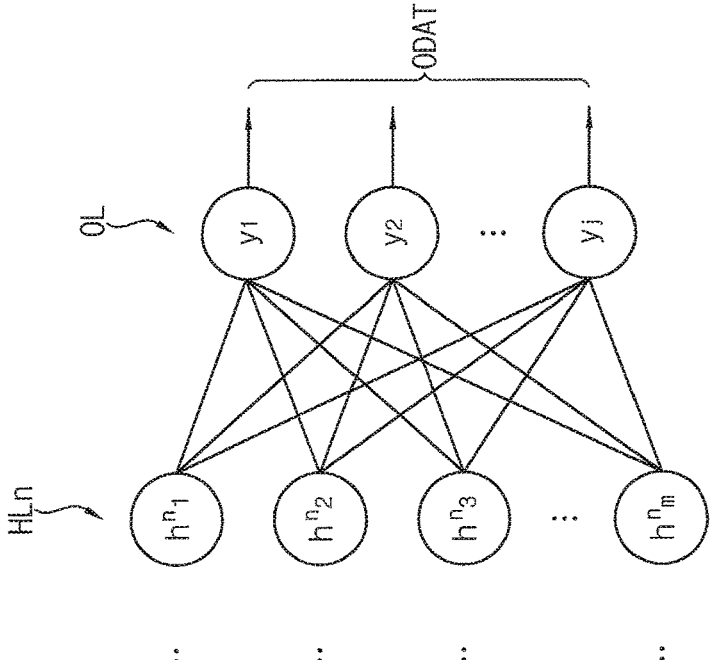
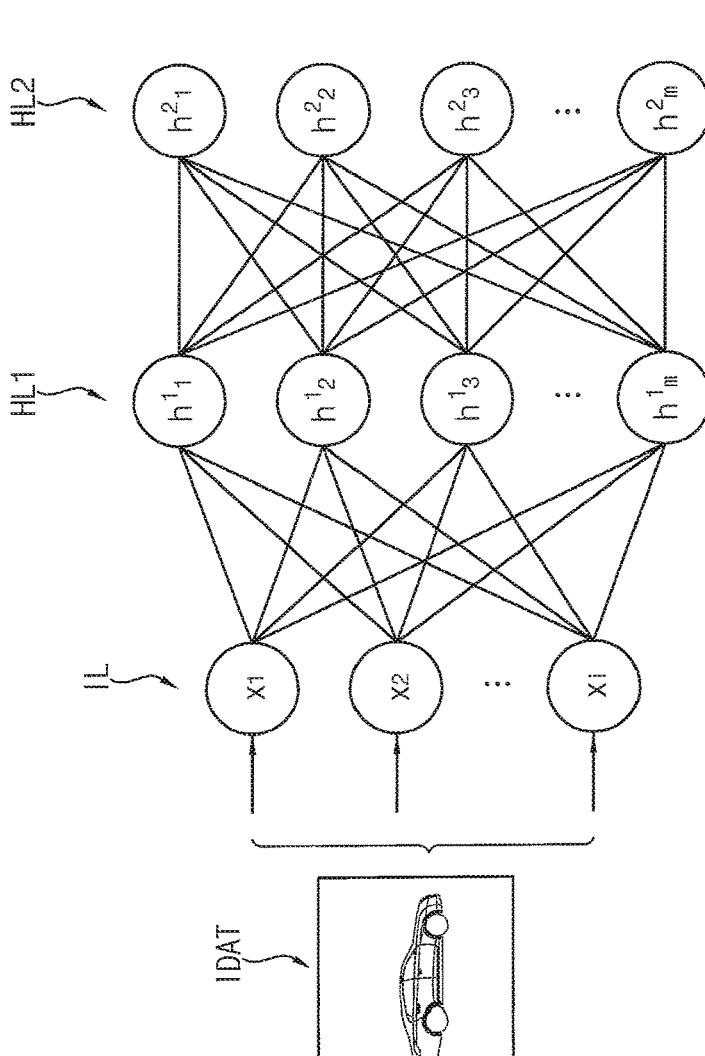

|  |  |  | K-MEANS |  |
|---|---|---|---|---|
| CLUSTER1 | INF1 | 3.7 | REF1 |
|  | INF2 | 1.1 |  |
|  | INF3 | 2.5 |  |
| CLUSTER2 | INF4 | 5.3 | REF2 |
|  | INF5 | 1.7 |  |
|  | INF6 | 2.6 |  |

FIG. 14

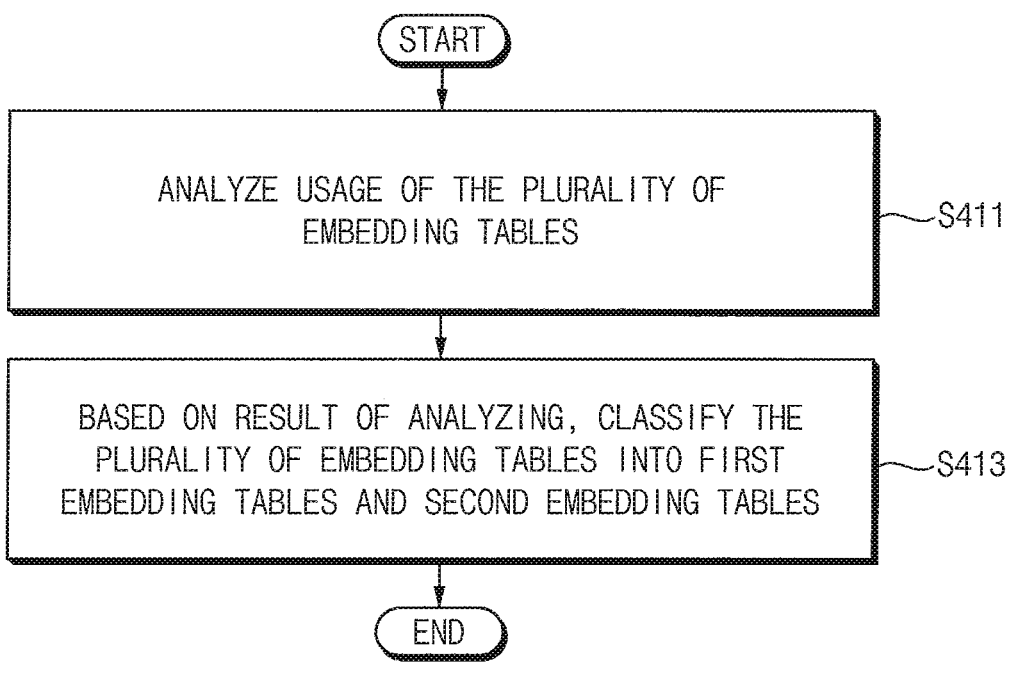

( START )

↓

ANALYZE USAGE OF THE PLURALITY OF
EMBEDDING TABLES                                    ~S411

↓

BASED ON RESULT OF ANALYZING, CLASSIFY THE
PLURALITY OF EMBEDDING TABLES INTO FIRST
EMBEDDING TABLES AND SECOND EMBEDDING TABLES        ~S413

↓

( END )

FIG. 15

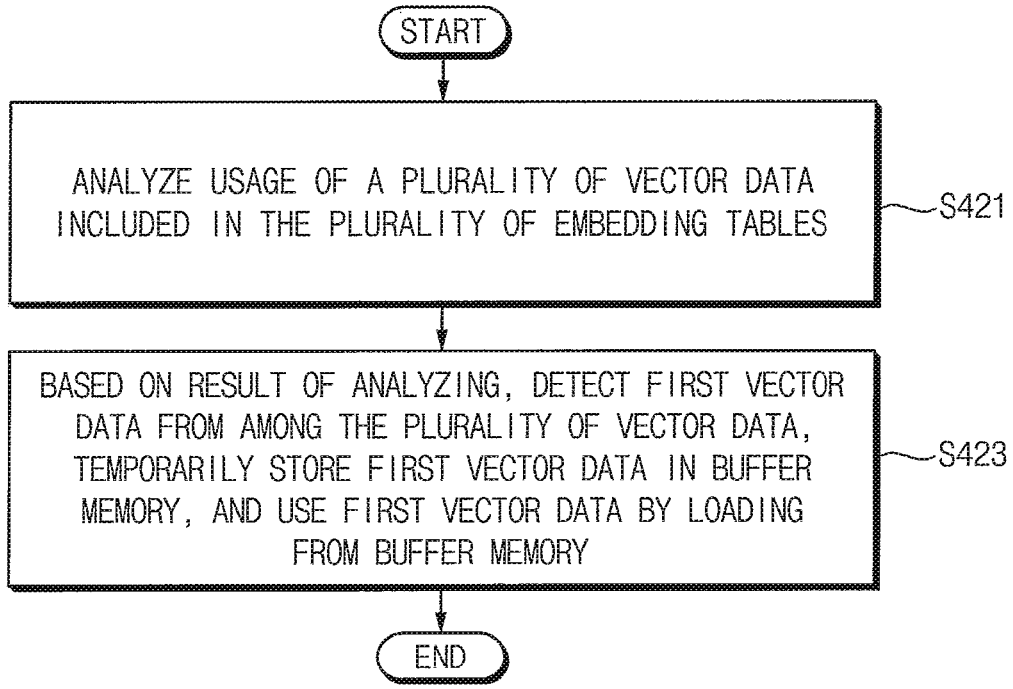

( START )

↓

ANALYZE USAGE OF A PLURALITY OF VECTOR DATA
INCLUDED IN THE PLURALITY OF EMBEDDING TABLES       ~S421

↓

BASED ON RESULT OF ANALYZING, DETECT FIRST VECTOR
DATA FROM AMONG THE PLURALITY OF VECTOR DATA,
TEMPORARILY STORE FIRST VECTOR DATA IN BUFFER
MEMORY, AND USE FIRST VECTOR DATA BY LOADING
FROM BUFFER MEMORY                                  ~S423

↓

( END )

1

COMPUTATIONAL STORAGE DEVICE FOR DEEP-LEARNING RECOMMENDATION SYSTEM AND METHOD OF OPERATING THE SAME

CROSS-REFERENCE TO RELATED APPLICATIONS

This application claims priority under 35 USC § 119 to Korean Patent Application No. 10-2021-0128011, filed on Sep. 28, 2021, in the Korean Intellectual Property Office (KIPO), the disclosure of which is incorporated by reference herein in its entirety.

TECHNICAL FIELD

The inventive concept relates to semiconductor integrated circuits, and more particularly to computational storage devices for deep-learning recommendation system (DLRS) and methods of operating the computational storage devices.

DISCUSSION OF RELATED ART

Semiconductor memory devices such as solid state drives (SSDs) are data storage devices that use semiconductor technology to provide increased performance over hard disk drives (HDDs). For example, semiconductor memory devices may lack moving (and breakable) mechanical parts, unlike HDDs, and may have higher data access speeds, stability, durability, and/or lower power consumption than HDDs. SSDs have been adopted in various systems, such as laptop computers cars, airplanes, drones, etc., for reliable data storage.

A computing system may include a host device for processing data based on executed instructions or programs. Due to size and memory constraints, the computing system may include a storage device for storing the instructions (or programs) and data. In this case, the instructions and data are transmitted from the storage device to the host device, and the host device processes the data based on the instructions. An example implementation is in the use of embedding tables that are used in a deep-learning recommendation system (DLRS). However, this communication between the host device and the storage device may serve as a bottleneck for the operating speed of the computing system. There is therefore need in the art for a computational storage device that efficiently manages memory to avoid a throughput bottleneck between a storage device and a host device.

SUMMARY

Aspects of the present disclosure provide a computational storage device capable of efficiently performing calculations associated with an embedding table used in a deep-learning recommendation system (DLRS).

Aspects of the present disclosure provide a method of operating the computational storage device.

According to at least one embodiment, a computational storage device is provided. The computational storage device includes a nonvolatile memory configured to store a plurality of embedding tables for a deep-learning recommendation system (DLRS), and a storage controller configured to control an operation of the nonvolatile memory, store a plurality of applications that are off-loaded from a host device executing the DLRS, and support an execution of the DLRS by executing the plurality of applications and performing a plurality of calculations based on the plurality of embedding tables. The storage controller includes a machine learning engine configured to determine a management scheme of at least one embedding table of the plurality of embedding tables and the plurality of applications by analyzing the at least one embedding table and the plurality of applications.

According to at least one embodiment, in a method of operating a computational storage device is provided. The method includes storing a plurality of applications that are off-loaded from a host device executing a deep-learning recommendation system (DLRS), storing a plurality of embedding tables that are used in the DLRS. supporting an execution of the DLRS by executing the plurality of applications and performing a plurality of calculations based on the plurality of embedding tables. and determining a management scheme of at least one of the plurality of embedding tables and the plurality of applications by analyzing the at least one of the plurality of embedding tables and the plurality of applications.

According to at least one embodiment, a computational storage device is provided. The computational storage device includes a nonvolatile memory configured to store a plurality of embedding tables for a deep-learning recommendation system (DLRS), a buffer memory configured to temporarily store data stored in or to be stored in the nonvolatile memory, and a storage controller configured to control an operation of the nonvolatile memory, store a plurality of applications that are off-loaded from a host device executing the DLRS, and support an execution of the DLRS by executing the plurality of applications and performing a plurality of calculations based on the plurality of embedding tables. The computational storage device further includes a reconfigurable hardware configured to store and execute at least one of the plurality of applications. The reconfigurable hardware is disposed inside or outside the storage controller. The storage controller includes a machine learning engine configured to analyze at least one of the plurality of embedding tables and the plurality of applications by performing a k-means clustering operation, a support vector machine (SVM) operation, and an estimating operation based on a plurality of internal information, and determine a management scheme of the at least one of the plurality of embedding tables and the plurality of applications based on a result of analyzing the at least one of the plurality of embedding tables and the plurality of applications. The machine learning engine is further configured to analyze usage of the plurality of embedding tables and classify the plurality of embedding tables into first embedding tables stored in single-level memory cells (SLCs) and second embedding tables stored in multi-level memory cells (MLCs), or analyze usage of a plurality of vector data included in the plurality of embedding tables, temporarily store at least one of the plurality of vector data in the buffer memory, and use the at least one of the plurality of vector data stored in the buffer memory, or analyze usage of a plurality of operators associated with the plurality of applications, store at least one of the plurality of applications in the reconfigurable hardware, and use the at least one of the plurality of applications stored in the reconfigurable hardware.

According to some aspects of the present disclosure, in the computational storage device and the method of operating the computational storage device, the plurality of embedding tables that are used in the DLRS are stored in the computational storage device, the plurality of applications are off-loaded to the computational storage device, and the computational storage device supports the execution of the DLRS. Furthermore, the machine learning engine included in the computational storage device determines the management scheme of at least one embedding table of the plurality of embedding tables and the plurality of applications. Accordingly, a computational storage device according to aspects of the present disclosure increases or enhances the performance of the DLRS.

BRIEF DESCRIPTION OF THE DRAWINGS

The above and other features of the present inventive concept will become more apparent by describing in detail embodiments thereof with reference to the accompanying drawings, in which:

FIGS. 8B, 8C, and 8D are diagrams for describing a neural network of a machine learning model included in a computational storage device according to at least one embodiment;

FIGS. 14, 15, 16, and 17 are flowcharts illustrating processes for determining a management scheme in FIG. 13.

DETAILED DESCRIPTION

Figure 1:
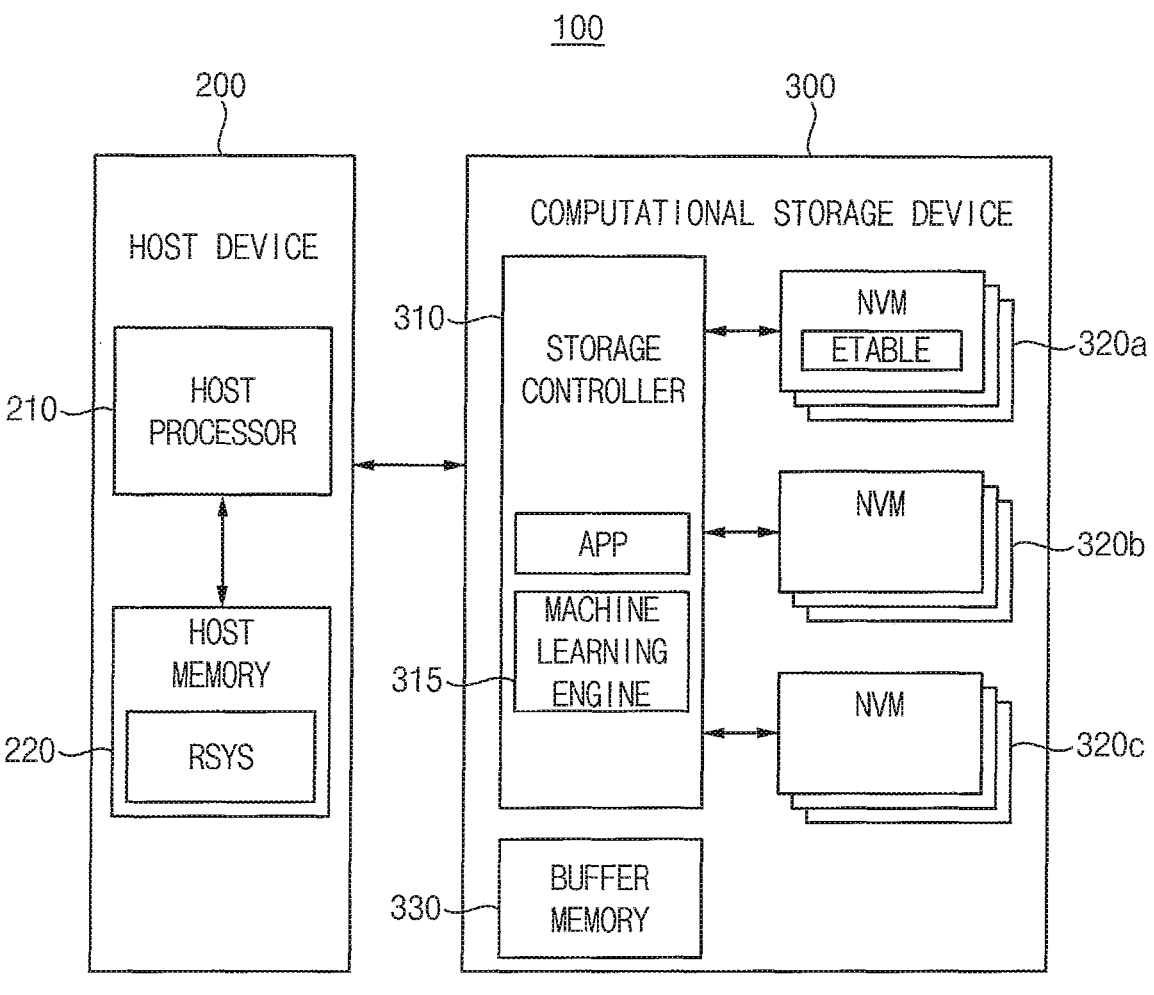
FIG. 1 is a block diagram illustrating a computational storage device and a storage system including the computational storage device according to at least one embodiment.

Embodiments of the inventive concept will be described more fully hereinafter with reference to the accompanying drawings. Like reference numerals may refer to like elements throughout the accompanying drawings.

It will be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the embodiments.

As used herein, the singular forms "a," "an" and "the" are intended to include the plural forms as well, unless the context clearly indicates otherwise.

FIG. 1 is a block diagram illustrating a computational storage device and a storage system including the computational storage device according to at least one embodiment.

Referring to FIG. 1, a storage system 100 includes a host device 200 and a computational storage device 300. According to some aspects, the host device 200 controls overall operations of the storage system 100. In some embodiments, the host device 200 includes a host processor 210 and a host memory 220.

In some embodiments, the host processor 210 controls an operation of the host device 200. In an example, the host processor 210 controls the operation of the host device 200 by executing an operating system (OS). In some embodiments, the operating system includes a file system for file management and a device driver for controlling peripheral devices including the computational storage device 300 at the operating system level. In some embodiments, the host processor 210 includes at least one of various processing units, such as a central processing unit (CPU), or the like.

According to some aspects, the host memory 220 stores instructions and/or data that are executed and/or processed by the host processor 210. In some embodiments, the host memory 220 includes at least one of various volatile memories, such as a dynamic random access memory (DRAM) or the like.

In at least one embodiment, the host device 200 executes a deep-learning recommendation system (DLRS). According to some aspects, the host memory 220 stores data RSYS that is used to execute the DLRS, and the host processor 210 performs various calculations (e.g., computational tasks and/or arithmetic operations) for executing the DLRS using the data RSYS.

Recommendation systems or recommender systems such as the DLRS can be an intuitive line of defense against consumer over-choice. Given the explosive growth of information available on the web, users can experience a choice of countless products, movies, restaurants, etc. As such, personalization is an essential strategy for facilitating a better web experience for a user. Recommendation systems play a vital and indispensable role in various information access systems and boost businesses by facilitating decision-making process, and recommendation systems are pervasive across numerous web domains such as e-commerce and/or media websites. Recommendation systems can generate recommendation lists based on user preferences, item features, past user-item interactions, and other information such as temporal and spatial data. Recommendation systems are mainly categorized into collaborative filtering, content-based recommendation systems, and hybrid recommendation systems based on the types of input data the recommendation systems receive.

Artificial neural networks (ANNs) are obtained by engineering a cell structure model of a human brain for efficiently performing pattern-recognition processes. An ANN can be a calculation model that is implemented through software or hardware and is designed to imitate biological calculation abilities by applying artificial neurons interconnected through connection lines. The human brain consists of neurons that are basic units of a nerve, and encrypts or decrypts information according to different types of dense connections between these neurons. Artificial neurons in an ANN are obtained through simplification of biological neuron functionality.

The term "deep learning" refers to the use of deep neural networks (DNNs), a type of ANN that include relatively complex layers and depths, to perform machine learning techniques. Both ANNs and DNNs perform a cognition or learning process by interconnecting artificial neurons of varying connection intensities. Thus, machine-learning processes and services may be performed based on one or more ANNs and DNNs.

The past few decades have witnessed the tremendous success of deep-learning in many application domains, such as computer vision and speech recognition. Academia and industry have been in a race to apply deep learning to a wider range of domains due to its ability to solve many complex tasks while providing start-of-the-art results.

Deep-learning recommendation systems or deep-learning based recommender systems apply deep-learning techniques to recommendation systems. Deep-learning techniques have revolutionized recommendation system architecture and have presented opportunities to increase the performance of recommendation systems. For example, recent advances in deep-learning recommendation systems have overcome obstacles faced by conventional recommendation systems and achieved high recommendation quality by effectively capturing non-linear and non-trivial user-item relationships and enabling codification of more complex abstractions as data representations in higher neural network layers. Furthermore, deep learning recommendation systems can catch intricate relationships within the data itself from abundant accessible data sources, such as contextual, textual, and visual information.

According to some aspects, the computational storage device 300 is accessed by the host device 200. Unlike a conventional storage device that may only perform a data storage function, in at least one embodiment, the computational storage device 300 performs both a data storage function and a data processing function together. In an example, the computational storage device 300 includes at least one of various elements or components that perform data processing, such as a central processing unit, etc.

According to some aspects, the computational storage device 300 includes a storage controller 310, a plurality of nonvolatile memories 320a, 320b and 320c, and a buffer memory 330. In some embodiments, the storage controller 310 controls an operation of the computational storage device 300, such as a data write operation and/or a data read operation, based on a command and data that are received from the host device 200. In some embodiments, the plurality of nonvolatile memories 320a, 320b, and 320c store a plurality of data, such as meta data, various user data, or the like.

In some aspects, at least one of the plurality of nonvolatile memories 320a, 320b, and 320c may include a NAND flash memory. In some aspects, at least one of the plurality of nonvolatile memories 320a, 320b, and 320c includes one of an electrically erasable programmable read only memory (EEPROM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or the like.

According to some aspects, the buffer memory 330 stores instructions and/or data that are executed and/or processed by the storage controller 310. In some embodiments, the buffer memory 330 temporarily stores data that is stored in or is to be stored in the plurality of nonvolatile memories 320a, 320b, and 320c. In at least one embodiment, the buffer memory 330 includes at least one of various volatile memories, such as a static random access memory (SRAM), a DRAM, or the like.

According to some aspects, at least one of the plurality of nonvolatile memories 320a, 320b, and 320c stores a plurality of embedding tables ETABLE that are used in the DLRS. According to some aspects, at least one of the plurality of nonvolatile memories 320a, 320b, and 320c stores a plurality of embedding tables ETABLE for the DLRS. According to some aspects, at least one of the plurality of nonvolatile memories 320a, 320b, and 320c stores a plurality of DLRS embedding tables ETABLE. For example, in at least one embodiment, the plurality of embedding tables ETABLE are used in a sparse feature analysis operation performed in the DLRS as described with reference to FIG. 2.

According to some aspects, the storage controller 310 stores a plurality of applications APP that are off-loaded from the host device 200 executing the DLRS, and supports an execution of the DLRS by executing the plurality of applications APP and by performing a plurality of calculations based on the plurality of embedding tables ETABLE. For example, in at least one embodiment, the plurality of applications APP include various operators and/or calculators that are executed to generate recommendation results in the DLRS to as described with reference to FIG. 2.

According to some aspects, the DLRS is executed by the host device 200 and the plurality of applications APP are also executed by the host device 200. According to some aspects, the computational storage device 300 performs a data processing function, the plurality of applications APP are off-loaded to the computational storage device 300 (for example, to the storage controller 310), and the computational storage device 300 executes the plurality of applications APP. In at least one embodiment, the storage controller 310 executes the plurality of applications APP.

The term "off-loading" refers to transferring resource-intensive computational tasks to a separate processor, such as a hardware accelerator, or to an external platform, such as a cluster, grid, or a cloud. According to some aspects, off-loading an application such as an image rendering application or a mathematical computation to a co-processor is used to accelerate the application or mathematical computation. Off-loading applications and computations to an external platform over a network may provide increased computing power and help to overcome hardware limitations of a device, such as limited computational power, storage, and energy.

According to some aspects, the host device 200, the computational storage device 300, and/or the storage controller 310 operate based on nonvolatile memory express (NVMe) technical proposal (TP) 4091 protocol. The NVMe TP 4091 protocol is a standard proposed by the Storage Networking Industry Association (SNIA) for off-loading applications from a host device to a storage device. In at least one embodiment, at least one of the host device 200, the computational storage device 300. and the storage controller 310 applies the NVMe TP 4091 protocol to transmit and receive both calculations and commands together.

According to some aspects, the storage controller 310 includes a machine learning engine 315. In at least one embodiment, the machine learning engine 315 determines a management scheme of at least one of the plurality of embedding tables ETABLE and the plurality of applications APP by analyzing the at least one of the plurality of embedding tables ETABLE and the plurality of applications APP. Examples of the management scheme will be described with reference to FIGS. 4, 5A, 5B, and 6. Examples of using the machine learning engine 315 for determining the management scheme will be described with reference to FIGS. 3, 4, 5B, 6, and 13. In at least one embodiment, the machine learning engine 315 is implemented as a machine learning model as described with reference to FIGS. 8B-12B. According to some aspects, the machine learning engine 315 is implemented as a hardware circuit, in firmware, or as a software component.

In at least one embodiment, the computational storage device 300 is a solid state drive (SSD). In at least one embodiment, the computational storage device 300 is a universal flash storage (UFS), a multi-media card (MMC), or an embedded multi-media card (eMMC). In at least one embodiment, the computational storage device 300 is one of a secure digital (SD) card, a micro SD card, a memory stick, a chip card, a universal serial bus (USB) card, a smart card, a compact flash (CF) card, or the like.

According to some aspects, the computational storage device 300 is connected to the host device 200 via a block accessible interface. In some embodiments, the block accessible interface includes at least one of a UFS, an eMMC, a serial advanced technology attachment (SATA) bus, a nonvolatile memory express (NVMe) bus, a serial attached SCSI (SAS) bus, or the like. In at least one embodiment, computational storage device 300 provides the block accessible interface to the host device 200 using a block accessible address space corresponding to an access size of the plurality of nonvolatile memories 320a, 320b, and 320c. By providing the block accessible interface to the host device 200, the computational storage device 300 allows units of a memory block to access data stored in the plurality of nonvolatile memories 320a, 320b, and 320c.

According to some aspects, the storage system 100 is a computing system, such as a personal computer (PC), a server computer, a data center, a workstation, a digital television, a set-top box, a navigation system, etc. According to some aspects, the storage system 100 is a mobile system, such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

Embedding tables are useful for a DLRS executed by a host device. The size of the embedding tables may be larger than a host memory can accommodate, and so an external memory may be used to store one or more of the embedding tables. According to some aspects, the DLRS may be implemented using the computational storage device 300 as an external memory. In some embodiments, the plurality of embedding tables ETABLE for the DLRS are stored in the computational storage device 300, the plurality of applications APP are off-loaded to the computational storage device 300, and the computational storage device 300 supports the execution of the DLRS.

In comparative examples, when a host device loads embedding tables stored in an external memory, performs calculations based on embedding tables, and stores a result of calculations in the external memory, a data transmission rate between the host device and the external memory may serve as a bottleneck, thereby constraining a throughput of an entire system. In contrast, according to some aspects, the machine learning engine 315 included in the computational storage device 300 determines a management scheme of at least one of the plurality of embedding tables ETABLE and the plurality of applications APP, and accordingly efficiently manages embedding table allocation in memory, thereby increasing or enhancing a performance of the DLRS.

Figure 2:
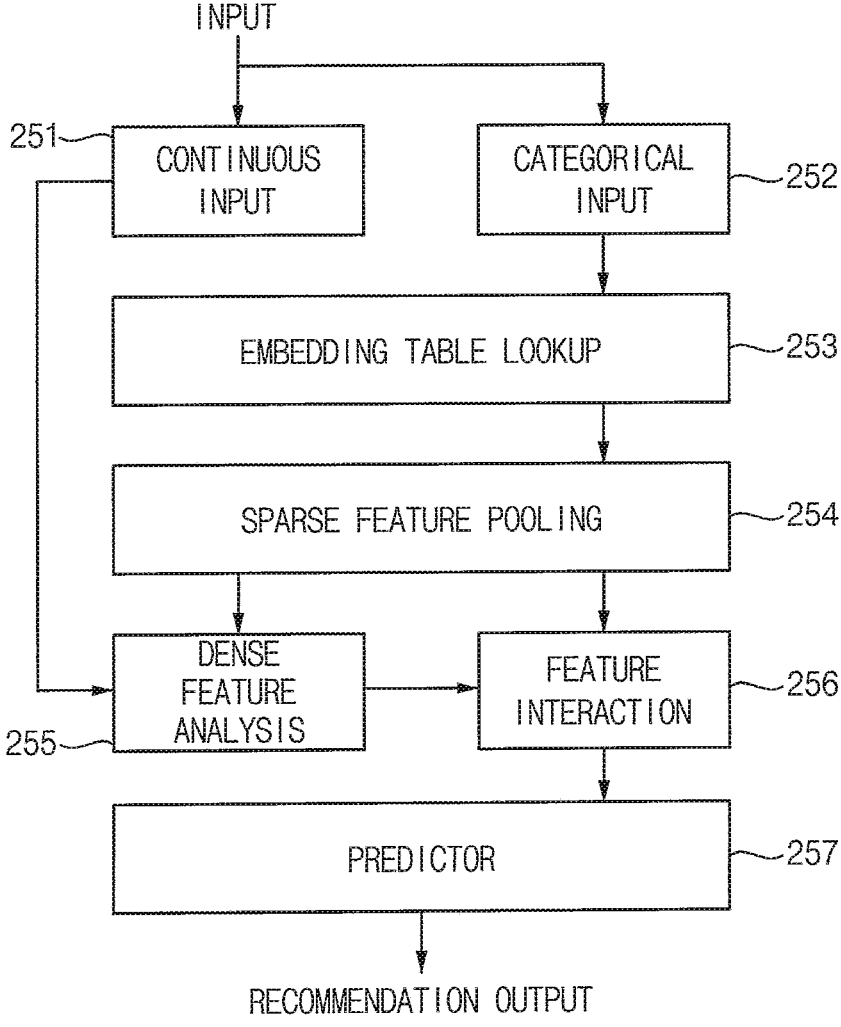
FIG. 2 is a diagram for describing a deep-learning recommendation system (DLRS) that is executed by a host device included in a storage system according to at least one embodiment.

FIG. 2 is a diagram for describing operations of a deep-learning recommendation system (DLRS) that is executed by a host device included in a storage system according to at least one embodiment.

Referring to FIG. 2, in an example, an input is provided to a DLRS, and the DLRS divides the input into a continuous input 251 corresponding to a dense feature and a categorical input 252 corresponding to a categorical feature or a sparse feature. In an example, the DLRS performs an embedding table lookup 253 and a sparse feature pooling (or analysis) 254 on the categorical input 252, thereby performing data processing corresponding to the dense feature.

In an example, the DLRS performs an embedding table lookup 253 on categorical input 252. Embedding refers to a process of mapping discrete objects such as words to dense vectors. The vectors are used as inputs to layers of neural networks included in machine learning models of the DLRS. According to some aspects, the DLRS includes a plurality of embedding tables. In some embodiments, each embedding table is a two-dimensional (2D) table (e.g., a matrix) with rows corresponding to respective words of the categorical input 252 and columns corresponding to embedding dimensions of the categorical input 252. In at least one embodiment, the embedding table lookup 253 is performed as described with reference to FIG. 9. In an embodiment, the sparse feature pooling 254 is performed as described with reference to FIG. 8C.

A machine learning model may be implemented in the form of one or more neural networks, and words or text may be provided as input to the neural network. In an example, the input layer of a neural network may respectively transform input words to binarized sparse vectors. The binarized sparse vectors may be high-dimensional and sparse, and thus inefficient to use in the neural network. Accordingly, the high-dimensional sparse vectors may be processed by an embedding layer of the neural network to obtain corresponding low-dimensional dense vectors efficient to use in the neural network. For example, the sparse vectors may be mapped to respective dense vectors using embedding tables (e.g., embedding matrices).

According to some aspects, a dense feature analysis 255 may be performed on the continuous input 251 without the embedding table lookup 253.

According to some aspects, a feature interaction 256 may be performed based on a result of the sparse feature pooling 254 (e.g., a first dense vector) and a result of the dense feature analysis 255 (e.g., a second dense vector). According to some aspects, a predictor 257 may perform a prediction based on a result of the feature interaction 256 to provide an output to be recommended corresponding to the input.

In the DLRS illustrated in FIG. 2, a plurality of applications (e.g., the applications APP as described with reference to FIG. 1) may be executed and a plurality of embedding tables (e.g., the embedding tables ETABLE as described with reference to FIG. 1) may be used when the embedding table lookup 253 and the sparse feature pooling 254 are performed. According to some aspects, the DLRS is implemented using the computational storage device 300 as an external memory, the plurality of embedding tables ETABLE are stored in the computational storage device 300, the plurality of applications APP are off-loaded to the computational storage device 300, and the computational storage device 300 supports the execution of the DLRS by executing the plurality of applications APP and by performing the plurality of calculations based on the plurality of embedding tables ETABLE.

Figure 3:
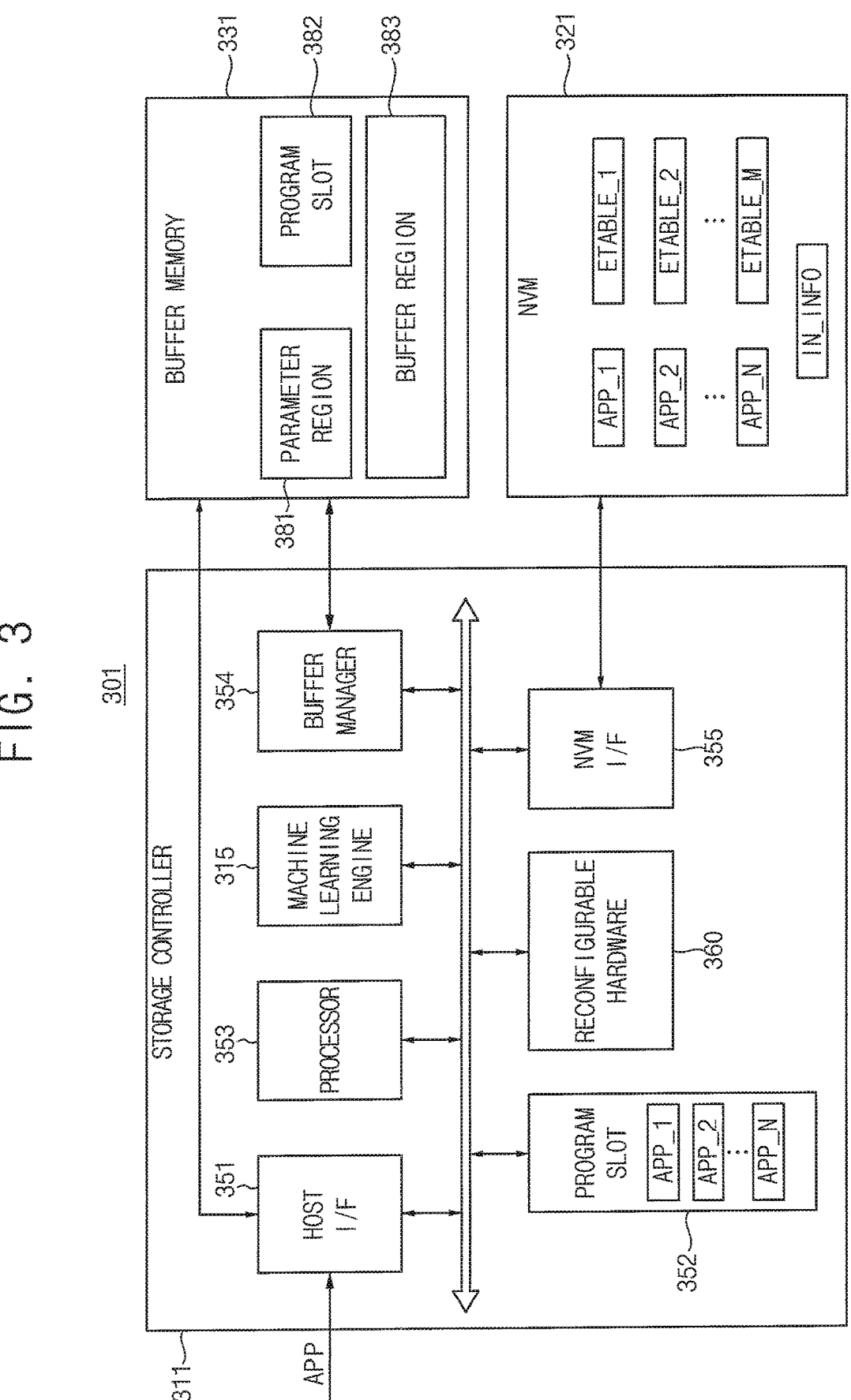
FIG. 3 is a block diagram illustrating a computational storage device according to at least one embodiment.

FIG. 3 is a block diagram illustrating a computational storage device according to at least one embodiment.

Referring to FIG. 3, in some embodiments, a computational storage device 301 includes a storage controller 311, a nonvolatile memory 321, and a buffer memory 331. In at least one embodiment, the storage controller 311, the nonvolatile memory 321, and the buffer memory 331 respectively correspond to the storage controller 310, the plurality of nonvolatile memories 320a, 320b, and 320c, and the buffer memory 330 as described with reference to FIG. 1.

According to some aspects, the storage controller 311 includes a machine learning engine 315, a host interface 351, a program slot 352, a processor 353, a buffer manager 354, a nonvolatile memory interface 355, and a reconfigurable hardware 360.

The machine learning engine 315 is an example of, or includes aspects of, the machine learning engine 315 as described with reference to FIG. 1. In some aspects, the machine learning engine 315 determines the management scheme of at least one of the plurality of embedding tables ETABLE and the plurality of applications APP by analyzing the at least one of the plurality of embedding tables ETABLE and the plurality of applications APP. In some embodiments, the machine learning engine 315 performs calculations to support the execution of the DLRS described with reference to FIG. 2.

According to some aspects, the host interface 351 provides physical connections between a host device (e.g., the host device 200 as described with reference to FIG. 1) and a computational storage device (e.g., the computational storage device 301 as described with reference to FIG. 1). In some embodiments, the host interface 351 provides an interface corresponding to a bus format of the host device 200 for communication between the host device 200 and the computational storage device 301. In some examples, the bus format of the host device 200 is a small computer system interface (SCSI) or a serial attached SCSI (SAS) interface. In some aspects, the bus format of the host device 200 is USB, peripheral component interconnect (PCI) express (PCIe), advanced technology attachment (ATA), parallel ATA (PATA), serial ATA (SATA), nonvolatile memory (NVM) express (NVMe), or a similar format.

In some aspects, the host interface 351 operates based on the NVMe TP 4091 protocol. For example, in some embodiments, the host interface 351 supports the NVMe TP 4091 protocol. In at least one embodiment, the plurality of applications APP are off-loaded from the host device 200 based on the NVMe TP 4091 protocol.

In some aspects, the host interface 351 operates based on the compute express link (CXL) protocol. For example, in some embodiments, the host interface 351 supports the CXL protocol. The CXL protocol is an open standard for high-speed central processing unit (CPU)-to-device and CPU-to-memory connections, designed for high performance data center computers. The CXL protocol is built on PCIe physical and electrical interface with protocols in three areas: input/output (I/O), memory, and cache coherence. In at least one embodiment, the host device 200 uses the buffer memory 331 of the computational storage device 301 as an external buffer memory and directly accesses the buffer memory 331 via the host interface 351 according to the CXL protocol.

According to some aspects, the program slot 352 stores the plurality of applications APP that are off-loaded from the host device 200. In some embodiments, the plurality of applications APP include first to N-th applications APP_1, APP_2, . . . , APP_N, where N is a natural number greater than or equal to two. in some embodiments, the first to N-th applications APP_1 to APP_N include various operators, such as string concatenation, sum, attention, recurrent neural network (RNN), or the like.

According to some aspects, the processor 353 controls an operation of the storage controller 311 in response to commands and/or calculations received via the host interface 351 from the host device 200. For example, in some embodiments, the processor 353 controls an operation of the computational storage device 301 and controls respective components by employing firmware for operating the computational storage device 301.

According to some aspects, the buffer manager 354 manages the buffer memory 331.

According to some aspects, the nonvolatile memory interface 355 exchanges data with the nonvolatile memory 321. In some embodiments, the nonvolatile memory interface 355 transfers data to the nonvolatile memory 321 and/or receives data read from the nonvolatile memory 321. In some embodiments, the nonvolatile memory interface 355 is configured to comply with a standard protocol such as Toggle or open NAND flash interface (ONFI).

According to some aspects, the reconfigurable hardware 360 is a hardware component for supporting the execution of the DLRS. In some embodiments, the reconfigurable hardware 360 is implemented as a field programmable gate array (FPGA). Referring to FIG. 3, in at least one embodiment, the reconfigurable hardware 360 is disposed or located inside the storage controller 311. That is, in some embodiments, the storage controller 311 includes the reconfigurable hardware 360.

In some embodiments, the storage controller 311 includes at least one of an error correction code (ECC) engine for error correction and an advanced encryption standard (AES) engine that performs at least one of an encryption operation and a decryption operation on data using various algorithms, such as a symmetric-key algorithm, etc.

According to some aspects, the nonvolatile memory 321 stores the plurality of embedding tables ETABLE, the plurality of applications APP, and a plurality of internal information IN_INFO. In some embodiments, the plurality of embedding tables ETABLE include first to M-th embedding tables ETABLE_1, ETABLE_2, . . . , ETABLE_M, where M is a natural number greater than or equal to two. In some embodiments, the number of embedding tables of the plurality of embedding tables ETABLE and the number of applications of the plurality of applications APP are equal to each other. In some embodiments, the number of embedding tables of the plurality of embedding tables ETABLE and the number of applications of the plurality of applications APP are different from each other. In some embodiments, the machine learning engine 315 determines the management scheme based on the plurality of internal information IN_INFO as described with reference to FIG. 9.

According to some aspects, the buffer memory 331 includes a parameter region 381, a program slot 382, and a buffer region 383. In some embodiments, the parameter region 381 is a storage space that stores parameters for applications, data, or the like. For example, in at least one embodiment, the parameter region 381 stores input data, result data, program arguments, or the like. In some embodiments, similarly to the program slot 352, the program slot 382 stores applications, programs, or the like. In some embodiments, the buffer region 383 is a storage space that buffers actual data. For example, in at least one embodiment, the buffer region 383 buffers data.

FIGS. 4, 5A, 5B, and 6 are diagrams for describing operations of a computational storage device of FIG. 3. FIGS. 4, 5A, 5B, and 6 illustrate a management scheme for managing at least one of the plurality of embedding tables ETABLE and the plurality of applications APP according to at least one embodiment of the inventive concept.

Figure 4:
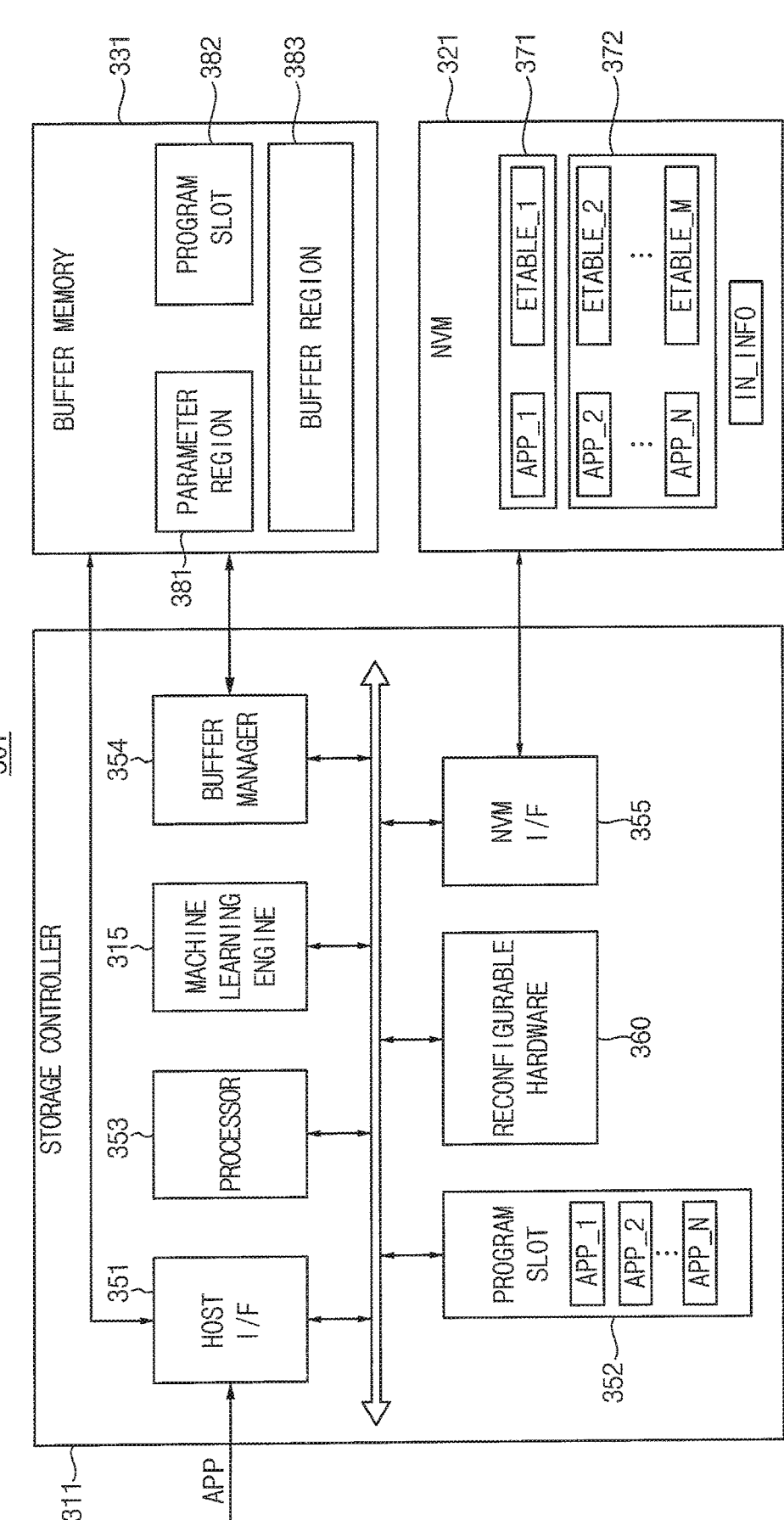
FIGS. 4, 5A, 5B, and 6 are diagrams for describing operations of a computational storage device of FIG. 3.

Referring to FIG. 4, according to some aspects, the machine learning engine 315 performs a table tiering management process by analyzing the usage of the plurality of embedding tables ETABLE_1 to ETABLE_M by the plurality of applications APP_1 to APP_N. For example, in at least one embodiment, the machine learning engine 315 classifies the plurality of embedding tables ETABLE_1 to ETABLE_M into first embedding tables (or embedding tables of a first group) and second embedding tables (or embedding tables of a second group) based on a result of analyzing the usage of the plurality of embedding tables ETABLE_1 to ETABLE_M.

In some embodiments, the machine learning engine 315 analyzes the usage of the plurality of embedding tables ETABLE_1 to ETABLE_M by determining a number of times that an embedding table of the plurality of embedding tables ETABLE_1 to ETABLE_M is used or accessed. The machine learning engine 315 then classifies the embedding table into the first embedding tables or second embedding tables based on a predetermined reference usage number, where an embedding table that is used or accessed a greater number of times than the reference usage number is classified as a first embedding table and an embedding table that is used a fewer number of times than the reference usage number is classified as a second embedding table. In some embodiments, the first embedding tables include the embedding table ETABLE_1 and the second embedding tables include the embedding tables ETABLE_2 to ETABLE_M. In some embodiments, the machine learning engine 315 manages or treats the first embedding tables as hot data, and manages or treats the second embedding tables as cold data.

According to some aspects, the nonvolatile memory 321 includes a first block 371 and a second block 372. In some embodiments, the first block 371 includes single-level memory cells (SLCs), each SLC storing one data bit. In some embodiments, the second block 372 includes multi-level memory cells (MLCs), each MLC storing two or more data bits. In at least one embodiment, an MLC stores only two data bits and the second block 372 includes at least one of an MLC, a triple-level memory cell (TLC) storing thee data bits, a quadruple-level memory cell (QLC) four data bits, and so on.

According to some aspects, the first embedding tables are stored in the first block 371, where the first block 371 has a faster operating speed than the second block 372, and the second embedding tables are stored in the second block 372, where the second block 372 has a slower operating speed lower than the first block 371.

According to some aspects, similarly to the plurality of embedding tables ETABLE_1 to ETABLE_M, the machine learning engine 315 classifies the plurality of applications APP_1 to APP_N into first applications (or applications of a first group) (e.g., the application APP_1) and second applications (or applications of a second group) (e.g., the applications APP_2 to APP_N). In some embodiments, the number of times the first applications are used or accessed is relatively great, and the number of times the second applications are used or accessed is relatively small. For example, in some embodiments, the first applications are used more often than the second applications. In some embodiments, the first applications are stored in the first block 371 and the second applications are stored in the second block 372.

Figure 5A:
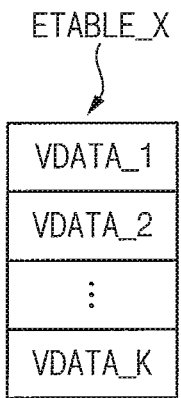

Referring to FIG. 5A, an X-th embedding table ETABLE_X among the plurality of embedding tables ETABLE_1 to ETABLE_M is illustrated, where X is a natural number greater than or equal to one and less than or equal to M. According to some aspects, the X-th embedding table ETABLE_X includes a plurality of vector data. in some embodiments, the plurality of vector data includes first to K-th vector data VDATA_1, VDATA_2, . . . , VDATA_K, where K is a natural number greater than or equal to two.

As described with reference to FIG. 2, according to some aspects, each embedding table of the plurality of embedding tables ETABLE_1 to ETABLE_M is a 2D table with rows corresponding to words and columns corresponding to embedding dimensions. In some embodiments, an embedding table of the plurality of embedding tables ETABLE_1 to ETABLE_M includes thousands to billions of rows corresponding to thousands to billions of words and tens to thousands of columns corresponding to tens to thousands of embedding dimensions, such that the embedding table has a size ranging from hundreds of MBs to hundreds of GBs. In some embodiments, each vector data of the plurality of vector data corresponds to some rows and some columns of each embedding table. In some embodiments, all data in the embedding table is not always used in performing calculations, and only some data (e.g., some vector data) may be used in performing calculations.

Figure 5B:

Referring to FIG. 5B, in at least one embodiment, the machine learning engine 315 performs buffering management (e.g., an operation of managing or controlling the buffer manager 354) by analyzing the usage of the plurality of vector data VDATA_1 to VDATA_K included in the plurality of embedding tables ETABLE_1 to ETABLE_M.

In some embodiments, based on a result of analyzing the usage of the plurality of vector data VDATA_1 to VDATA_K, the machine learning engine 315 detects at least one of the plurality of vector data VDATA_1 to VDATA_K, and temporarily stores the detected vector data in the buffer memory 331. In some embodiments, the detected vector data temporarily stored in the buffer memory 331 is used by loading from the buffer memory 331. In some embodiments, the machine learning engine 315 detects vector data whose number of times of usage (or access) is greater than a reference number of times. For example, the machine learning engine 315 detects vector data by comparing usage of the vector data with a reference vector data usage and determining that the vector data has been used more often than the reference vector data usage. In some embodiments, the detected vector data includes Y-th vector data VDATA Y included in the embedding table ETABLE_2, where Y is a natural number greater than or equal to one and less than or equal to K. In some embodiments, the machine learning engine 315 stores the detected vector data in the buffer region 383 of the buffer memory 331.

Figure 6:
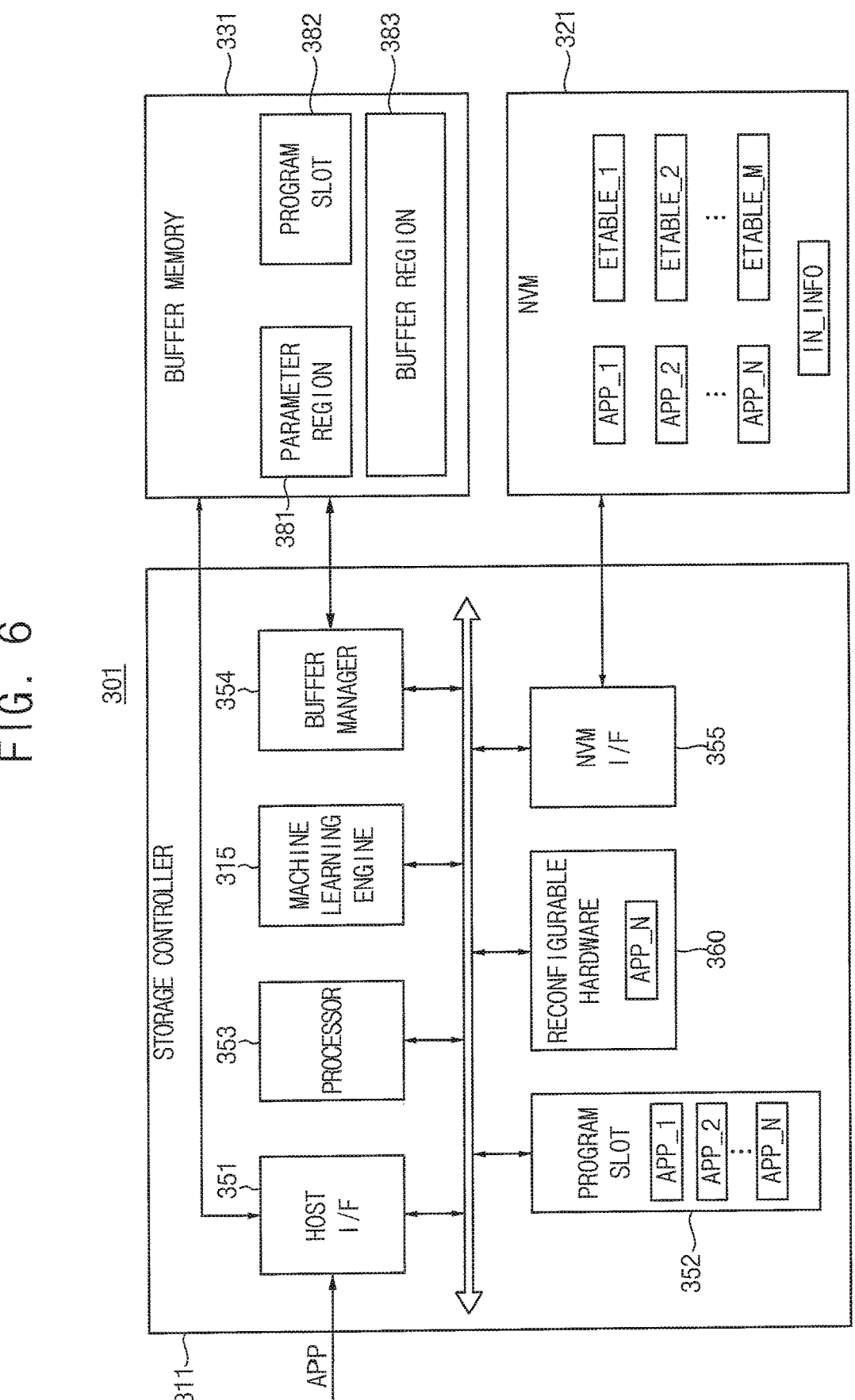

Referring to FIG. 6, in at least one embodiment, the machine learning engine 315 performs hardware management (e.g., an operation of managing or controlling the reconfigurable hardware 360) by analyzing the usage of a plurality of operators associated with or related to the plurality of applications APP_1 to APP_N.

In some embodiments, based on a result of analyzing the usage of the plurality of operators, the machine learning engine 315 detects at least one of the plurality of applications APP_1 to APP_N and stores the detected application in the reconfigurable hardware 360. In some embodiments, the detected application stored in the reconfigurable hardware 360 is used by the reconfigurable hardware 360. In some embodiments, the machine learning engine 315 detects an application whose number of times of usage (or access) is greater than a reference number of times. For example, the machine learning engine 315 detects an application by comparing usage of the application with a reference application usage and determining that the application has been used more often than the reference application usage. In some embodiments, the detected application is the application APP_N. In some embodiments, the reconfigurable hardware 360 stores and executes the detected application.

Therefore, in the computational storage device 301 according to embodiments of the inventive concept, by analyzing at least one of the plurality of embedding tables ETABLE and the plurality of applications APP, table tiering management may be performed as described with reference to FIG. 4 such that a frequently/highly used embedding table is stored in a first block 371 having relatively fast operating speed, and buffering management may be performed as described with reference to FIGS. 5A and 5B such that frequently/highly used vector data is stored in a buffer memory 331, and hardware management may be performed as described with reference to FIG. 6 such that a frequently/highly used application is executed by reconfigurable hardware 360. Accordingly, the computational storage device 301 according to aspects of the present disclosure increases and enhances the performance of the DLRS.

In some embodiments, the table tiering management as described with reference to FIG. 4, the buffering management as described with reference to FIGS. 5A and 5B, and the hardware management as described with reference to FIG. 6 are independently and/or individually performed. In some embodiments, two or more of the table tiering management as described with reference to FIG. 4, the buffering management as described with reference to FIGS. 5A and 5B, and the hardware management as described with reference to FIG. 6 are simultaneously or concurrently performed.

Figure 7:
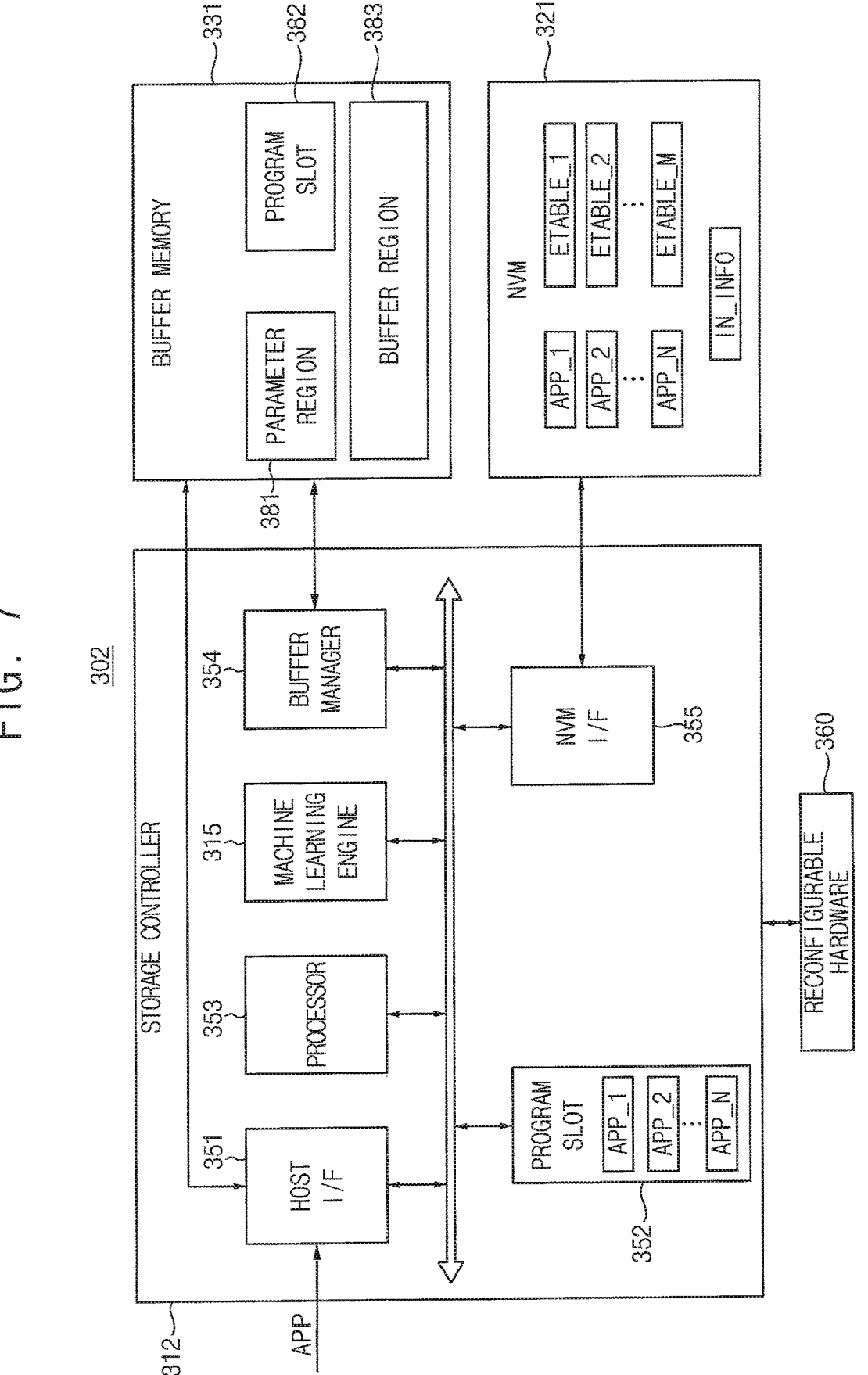
FIG. 7 is a block diagram illustrating a computational storage device according to at least one embodiment.

FIG. 7 is a block diagram illustrating a computational storage device according to at least one embodiment. Redundant descriptions of similar elements described with reference to FIG. 3 will be omitted.

Referring to FIG. 7, according to some aspects, a computational storage device 302 includes a storage controller 312, a nonvolatile memory 321, and a buffer memory 331, and further includes a reconfigurable hardware 360.

The computational storage device 302 is an example of or includes aspects of the computational storage device 301 as described with refence to FIG. 3. However, the reconfigurable hardware 360 is disposed outside the storage controller 312 (e.g., externally to the storage controller 312). In some embodiments, the computational storage device 302 manages at least one of the plurality of embedding tables ETABLE and the plurality of applications APP as described with reference to FIGS. 4, 5A, 5B, and 6.

Figure 8A:
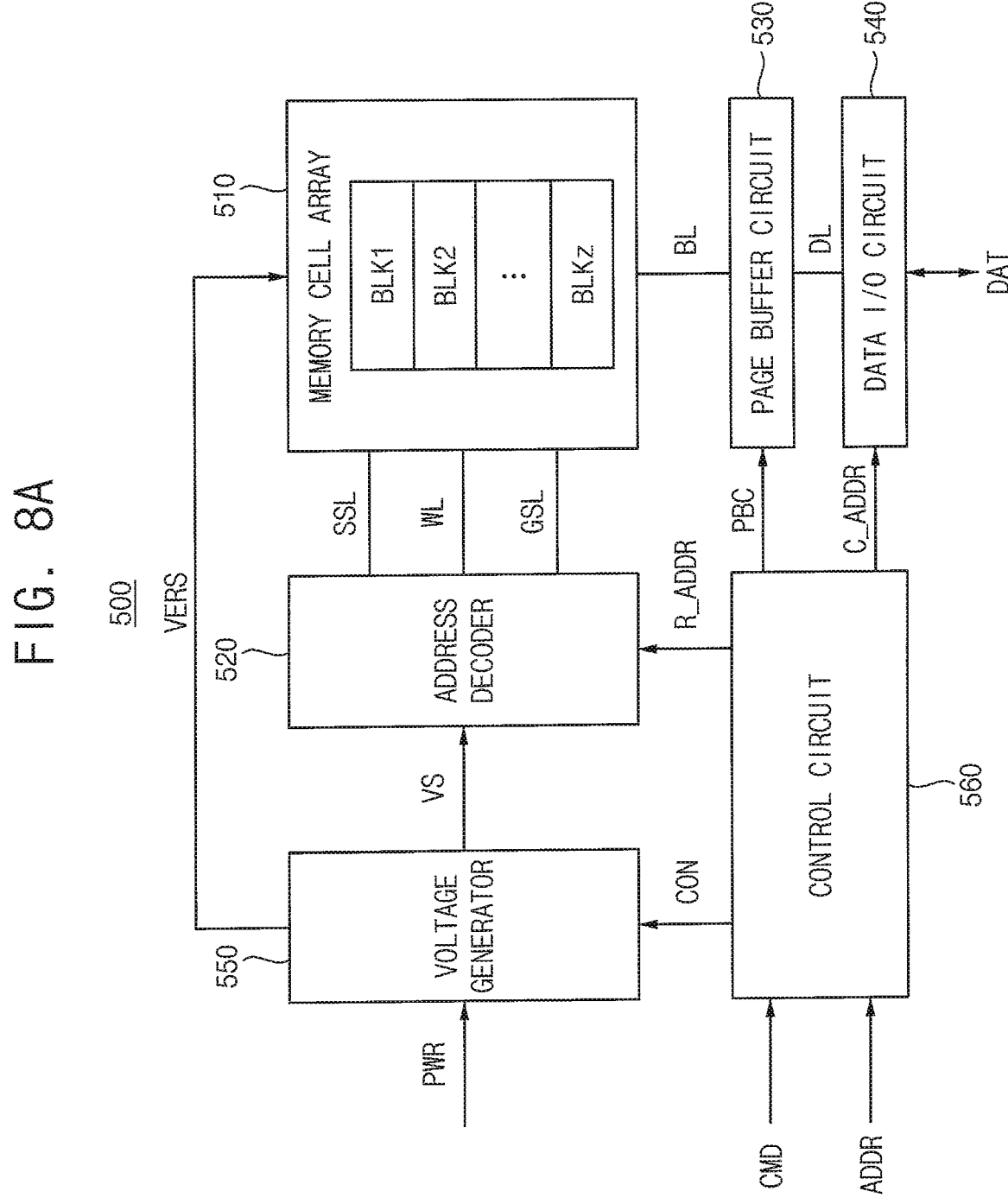
FIG. 8A is a block diagram illustrating a nonvolatile memory that is included in a computational storage device according to at least one embodiment.

FIG. 8A is a block diagram illustrating a nonvolatile memory that is included in a computational storage device according to at least one embodiment.

Referring to FIG. 8A, according to some aspects, a nonvolatile memory 500 includes a memory cell array 510, an address decoder 520, a page buffer circuit 530, a data input/output (I/O) circuit 540, a voltage generator 550, and a control circuit 560.

In some embodiments, the memory cell array 510 is connected to the address decoder 520 via a plurality of string selection lines SSL, a plurality of wordlines WL, and a plurality of ground selection lines GSL. In some embodiments, the memory cell array 510 is further connected to the page buffer circuit 530 via a plurality of bitlines BL. In some embodiments, the memory cell array 510 includes a plurality of memory cells (e.g., a plurality of nonvolatile memory cells) that are connected to the plurality of wordlines WL and the plurality of bitlines BL. According to some aspects, the memory cell array 510 is divided into a plurality of memory blocks BLK1, BLK2, . . . , BLKz, each memory block including memory cells.

According to some aspects, the plurality of memory cells are arranged in a two-dimensional (2D) array structure or a three-dimensional (3D) vertical array structure. In some embodiments, a 3D vertical array structure includes vertical cell strings that are vertically oriented such that at least one memory cell is located over another memory cell. According to some aspects, the at least one memory cell comprises a charge trap layer. The following patent publications describe suitable configurations for a memory cell array including a 3D vertical array structure in which the three-dimensional memory array is configured as a plurality of levels with wordlines and/or bitlines shared between levels, and are hereby incorporated by reference in their entirety: U.S. Pat. Nos. 7,679,133; 8,553,466; 8,654,587; and 8,559,235; and US Pat. Pub. No. 2011/0233648.

According to some aspects, the control circuit 560 receives a command CMD and an address ADDR from the outside (e.g., from a host device and/or a storage controller according to embodiments of the present disclosure), and controls erasure, programming, and read operations of the nonvolatile memory 500 based on the command CMD and the address ADDR. In some embodiments, an erasure operation includes performing a sequence of erase loops, and a program operation includes performing a sequence of program loops. In some embodiments, each program loop includes a program operation and a program verification operation, and each erase loop includes an erase operation and an erase verification operation. In some embodiments, the read operation includes a normal read operation and a data recovery read operation.

According to some aspects, the control circuit 560 generates control signals CON for controlling the voltage generator 550, generates a control signal PBC for controlling the page buffer circuit 530 based on the command CMD, and generates a row address R_ADDR and a column address C_ADDR based on the address ADDR. In some embodiments, the control circuit 560 provides the row address R_ADDR to the address decoder 520 and provides the column address C_ADDR to the data I/O circuit 540.

According to some aspects, the address decoder 520 is connected to the memory cell array 510 via the plurality of string selection lines SSL, the plurality of wordlines WL, and the plurality of ground selection lines GSL. In some embodiments, during the data erase/write/read operations of the nonvolatile memory 500, the address decoder 520 determines at least one of the plurality of wordlines WL as a selected wordline, determines at least one of the plurality of string selection lines SSL as a selected string selection line, and determines at least one of the plurality of ground selection lines GSL as a selected ground selection line based on the row address R_ADDR.

According to some aspects, the voltage generator 550 generates voltages VS for an operation of the nonvolatile memory 500 based on a power PWR and the control signals CON. In some embodiments, the voltages VS are applied to the plurality of string selection lines SSL, the plurality of wordlines WL, and the plurality of ground selection lines GSL via the address decoder 520. According to some aspects, the voltage generator 550 generates an erase voltage VERS for the data erase operation based on the power PWR and the control signals CON. In some embodiments, the erase voltage VERS is directly applied to the memory cell array 510 or is applied via the bitline BL.

According to some aspects, the page buffer circuit 530 is connected to the memory cell array 510 via the plurality of bitlines BL. In some embodiments, the page buffer circuit 530 includes a plurality of page buffers. In some embodiments, the page buffer circuit 530 operates as a write driver according to an operation mode of the nonvolatile memory 500 by storing data DAT to be programmed into the memory cell array 510 and/or operates as a sensing amplifier according to an operation mode of the nonvolatile memory 500 by reading data DAT sensed from the memory cell array 510.

According to some aspects, the data I/O circuit 540 is connected to the page buffer circuit 530 via data lines DL. In some embodiments, the data I/O circuit 540 provides the data DAT from outside of the nonvolatile memory 500 to the memory cell array 510 via the page buffer circuit 530 and/or provides the data DAT from the memory cell array 510 to outside of the nonvolatile memory 500 based on the column address C_ADDR.

Figure 8C:
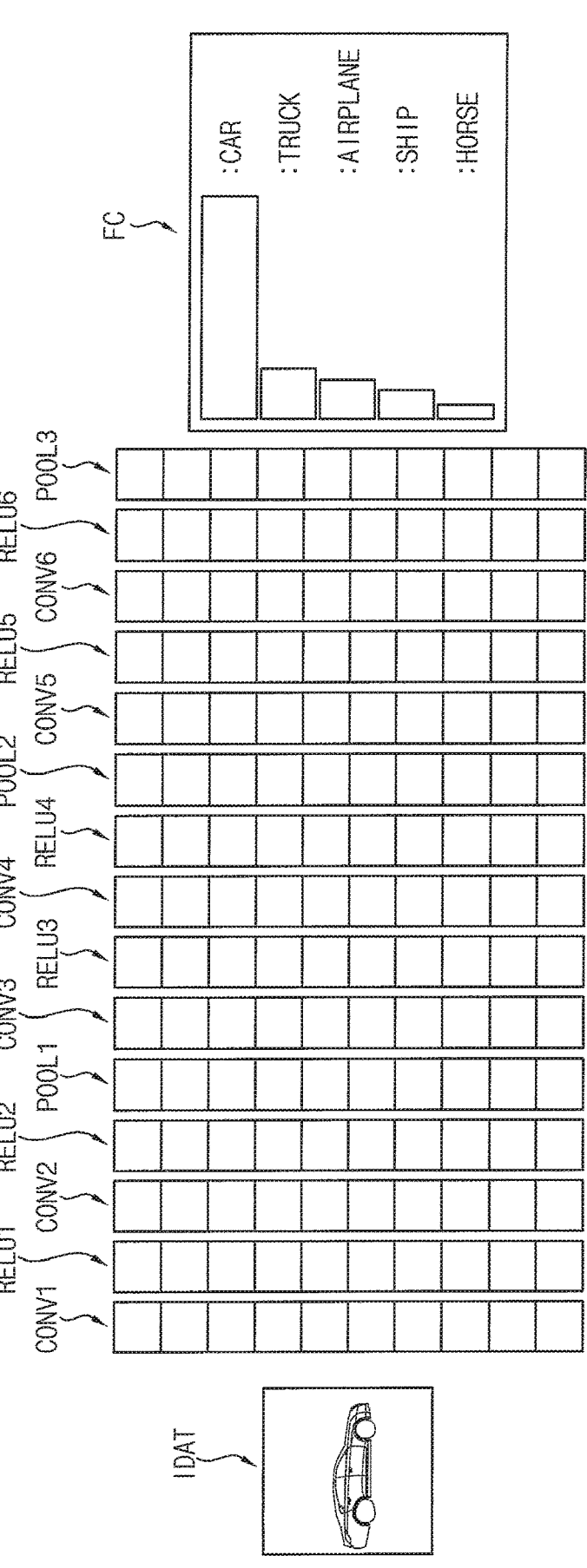
Figure 8D:
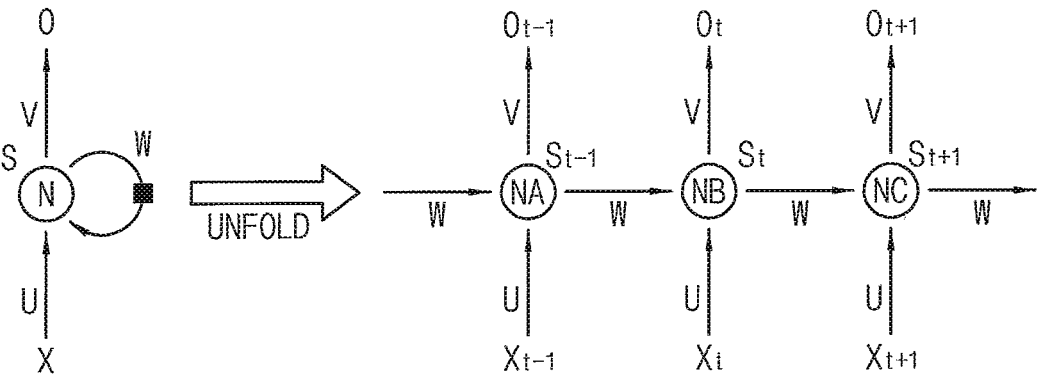

FIGS. 8B, 8C and 8D are diagrams for describing a network structure of one or more neural networks of a machine learning engine included in a computational storage device according to at least one embodiment.

Referring to FIG. 8B, according to some aspects, an artificial neural network (ANN) included in the machine learning engine includes an input layer IL, a plurality of hidden layers HL1, HL2, . . . , HLn, and an output layer OL.

In some embodiments, the input layer IL includes i input nodes $x_1$, $x_2$, . . . , $x_i$, where i is a natural number, and input data (e.g., vector input data) IDAT whose length is i is input to the input nodes $x_1$, $x_2$, . . . , $x_1$ such that each element of the input data IDAT is input to a respective one of the input nodes $x_1$, $x_2$, . . . , $x_1$.

In some embodiments, the plurality of hidden layers HL1, HL2, HLn include n hidden layers, where n is a natural number, and include a plurality of hidden nodes $h^1_1$, $h^1_2$, $h^1_3$, . . . , $h^1_m$ $h^2_1$, $h^2_2$, $h^2_3$, . . . , $h^2_m$, $h''_1$, $h''_2$, $h''_3$, . . . , $h''_m$. For example, the hidden layer HL1 includes m hidden nodes $h^1_1$, $h^1_2$, $h^1_3$, . . . , $h^1_m$, the hidden layer HL2 includes m hidden nodes $h^2_1$, $h^2_2$, $h^2_3$, $h^2_m$, and the hidden layer HLn includes m hidden nodes $h''_1$, $h''_2$, $h''_3$, . . . , $h''_m$, where m is a natural number.

In some embodiments, the output layer OL includes j output nodes $y_1$, $y_2$, . . . , $y_j$, where j is a natural number, and each of the output nodes $y_1$, $y_2$, . . . , $y_j$ corresponds to a respective class to be categorized. In some embodiments, output layer OL outputs output values such as class scores or various other scores associated with the input data IDAT for each of the classes. The output layer OL may be referred to as a fully-connected layer and may output data ODAT that indicates, for example, a probability that the input data IDAT corresponds to a certain object classification. Referring to FIG. 8B, for example, the output data ODAT indicates a probability that the input data IDAT corresponds to the class of cars.

Referring to FIG. 8B, the structure of the neural network may be represented by branches (or connections) between nodes illustrated as lines, and a weighted value assigned to each branch. Nodes included in one layer of the neural network might not be connected to one another, but nodes included in different layers from each other may be fully or partially connected to one another.

According to some aspects, a node such as node $h^1_1$ receives an output of a previous node such as node $x_i$, performs a computing operation, computation, or calculation on the received output, and outputs a result of the computing operation, computation, or calculation to a next node, such as node $h^2_1$. In some embodiments, each node calculates a value to be output by applying the input to a function, such as a nonlinear function.

According to some aspects, the structure of the neural network is set in advance, and weighted values for connections between the nodes are set appropriately using data having an already known answer of which class the data belongs to. The data with the already known answer is referred to as "training data", and a process of determining the weighted value is referred to as "training". The neural network "learns" during the training process. A group of one or more neural networks having an independently trainable structure and one or more weighted values is referred to as a "model", and a process of predicting, by the model with the determined weighted value, which class input data belongs to and then outputting the predicted value is referred to as a "testing" process. Therefore, in some embodiments, the machine learning engine is a machine learning model.

According to some aspects, the machine learning engine including the one or more neural networks is used in the deep-learning recommendation system, and at least one layer of the neural network is an embedding layer using the embedding table.

According to some aspects, the machine learning engine is used in the deep-learning recommendation system for recommending items such as products, content, or advertisements, etc. or in any other suitable applications. For example, the input data DAT may include a plurality of words (e.g., in text) in various categories, including but not limited to user IDs, user profiles, user interests, user behaviors, products, retail stores, places of origin, reviews, and advertisements. In some embodiments, the machine learning engine transforms the input words to binarized sparse vectors (e.g., one-hot encoded vectors) via one-hot coding. A one-hot encoded vector refers to a vector including a large number of integers that are zero. As a result, one-hot encoded vectors may be high-dimensional and sparse, and thus inefficient to use in the neural network.

Therefore, in some embodiments, the machine learning engine processes the high-dimensional sparse vectors using the embedding layer to obtain corresponding low-dimensional dense vectors. The machine learning engine maps the sparse vectors to respective dense vectors using embedding tables (e.g., embedding matrices). For example, the machine learning engine maps sparse vectors corresponding to words in a certain category to respective dense vectors using a respective embedding table. In some embodiments, the embedding layer includes a plurality of embedding tables for processing a plurality of categories of words. The dense vectors obtained from the embedding layer may have small dimension and may therefore be beneficial for the convergence of the machine learning engine.

According to some aspects, a dimension of an embedding table is reflected by a number of columns in the embedding table. In some embodiments, the dimension of the embedding table corresponds to a dimension of a dense vector (e.g., a number of numeric values included therein) obtained using the embedding table. The dimension of the dense vectors of a category corresponds to a multi-dimensional space containing the corresponding words in the category. The multi-dimensional space may be provided for grouping and characterizing semantically similar words. In some embodiments, the numeric values of a dense vector are used to position the corresponding word within the multi-dimensional space relative to other words in the same category. Accordingly, the machine learning engine may group the semantically similar items (e.g., categories of words) together and keep dissimilar items far apart using the multi-dimensional space. Positions (e.g., distance and direction) of dense vectors in a multi-dimensional space may reflect relationships between semantics in the corresponding words. In some embodiments, the machine learning obtains the dense vectors from different categories of words via the embedding layer, and then provides the dense vectors to other neural network layers for operations such as inference, estimation, prediction, etc.

The neural network as described with reference to FIG. 8B might not be suitable for handling input image data (or input sound data), as each node is connected to all nodes of a previous layer, and the number of weighted values drastically increases as the size of the input image data increases. Therefore, according to some aspects, the machine learning engine includes one or more convolutional neural networks (CNNs) that are implemented by combining a filtering technique with operations of neural network, such that the CNN is efficiently trained based on two-dimensional image data (e.g., the input image data).

Referring to FIG. 8C, according to some aspects, a CNN of the machine learning engine includes a plurality of layers CONV1, RELU1, CONV2, RELU2, POOL1, CONV3, RELU3, CONV4, RELU4, POOL2, CONV5, RELU5, CONV6, RELU6, POOLS, and FC.

In some embodiments, unlike the ANN, each layer of the CNN has three dimensions of width, height, and depth, and thus data that is input to each layer may be volume data having three dimensions of width, height, and depth.

According to some aspects, each of convolutional layers CONV1, CONV2, CONV3, CONV4, CONV5, and CONV6 perform a convolutional operation on input volume data. In some embodiments, in an image processing operation, the convolutional operation is an operation in which image data is processed based on a mask with weighted values and an output value is obtained by multiplying input values by the weighted values and adding up the total multiplied values. The mask may be referred to as a filter, window, or kernel.

In some embodiments, parameters of each convolutional layer consists of a set of learnable filters. Every filter may be small spatially (along width and height), but may extend through the full depth of an input volume. In some embodiments, during a forward pass, each filter may be slid (more precisely, convolved) across the width and height of the input volume, and dot products may be computed between the entries of the filter and the input at any position. As the filter is slid over the width and height of the input volume, a two-dimensional activation map that gives the responses of that filter at every spatial position is generated. As a result, the machine learning engine generates an output volume by stacking the activation maps along the depth dimension.

According to some aspects, each of RELU layers RELU1, RELU2, RELU3, RELU4, RELU5 and RELU6 perform a rectified linear unit (RELU) operation that corresponds to an activation function defined by a function $f(x)=\max(0, x)$, where an output is zero for all negative input x.

According to some aspects, each of pooling layers POOL1, POOL2, and POOL3 perform a down-sampling operation on input volume data along spatial dimensions of width and height. For example, four input values arranged in a 2*2 matrix formation may be converted into one output value based on a 2*2 filter. For example, a maximum value of four input values arranged in a 2*2 matrix formation may be selected based on 2*2 maximum pooling, or an average value of four input values arranged in a 2*2 matrix formation may be obtained based on 2*2 average pooling.

According to some aspects, an output layer or a fully-connected layer FC output results (e.g., class scores) of the input volume data IDAT for each of the classes. For example, the input volume data IDAT corresponding to the two-dimensional image may be converted into a one-dimensional matrix or vector as the convolutional operation and the down-sampling operation are repeated. For example, the fully-connected layer FC may represent probabilities that the input volume data IDAT corresponds to an object class, such as a car, a truck, an airplane, a ship, a horse, etc.

Referring to FIG. 8D, according to some aspects, a recurrent neural network (RNN) includes a repeating structure using a specific node or cell N illustrated on the left side of FIG. 8D.

In some embodiments, a structure illustrated on the right side of FIG. 8D represents that a recurrent connection of the RNN illustrated on the left side is unfolded (or unrolled). The term "unfolded" means that the RNN is written out or illustrated for the complete or entire sequence, including all nodes NA, NB, and NC. For example, if the sequence of interest is a sentence of 3 words, the RNN may be unfolded into a three-layer neural network, one layer for each word (e.g., without recurrent connections or without cycles).

Referring to FIG. 8D, X represents an input of the RNN. In some embodiments, $X_t$ is an input at time step t, and $X_{t-1}$ and $X_{t+1}$ are inputs at time steps t−1 and t+1, respectively.

S represents a hidden state of the RNN. In some embodiments, $S_t$ is a hidden state at the time step t, and $S_{t-1}$ and $S_{t+1}$ are hidden states at the time steps t−1 and t+1, respectively. In some embodiments, the hidden state is calculated based on a previous hidden state and an input at a current step: $S_t=f(UX_t+WS_{t-1})$.

In some embodiments, the function $f$ is a nonlinearity function such as tanh or RELU. In some embodiments, $S_{t-1}$, which is used to calculate a first hidden state, is initialized to all zeroes.

O represents an output of the RNN. In some embodiments, $O_t$ is an output at the time step t, and $O_{t-1}$ and $O_{t+1}$ are outputs at the time steps t−1 and t+1, respectively. For example, if the task of the RNN is to predict a next word in a sentence, the output O would be a vector of probabilities across a vocabulary. For example, $O_t=\text{softmax}(VS_t)$.

In the RNN as described with reference to FIG. 8D, a hidden state may be a "memory" of the network. In other words, in some embodiments, the RNN may have a "memory" that captures information about what the RNN has previously calculated. In some embodiments, the hidden state $S_t$ captures information about what happened in all the previous time steps. in some embodiments, the RNN calculates the output $O_t$ solely based on the memory at the current time step t. In addition, unlike a traditional neural network, which uses different parameters at each layer, in some embodiments, the RNN shares the same parameters (e.g., U, V, and W) across all time steps. This may represent the fact that a same task may be performed at each step, just with different inputs. This may greatly reduce the total number of parameters required to be trained or learned.

According to some aspects, the machine learning engine includes neural networks of varying architectures and functions, such as at least one of a region with convolution neural network (R-CNN), region proposal network (RPN), stacking-based deep neural network (S-DNN), state-space dynamic neural network (S-SDNN), deconvolution network, deep belief network (DBN), restricted Boltzman machine (RBM), fully convolutional network, long short-term memory (LSTM) network, classification network, and Bayesian neural network (BNN).

Figure 9:
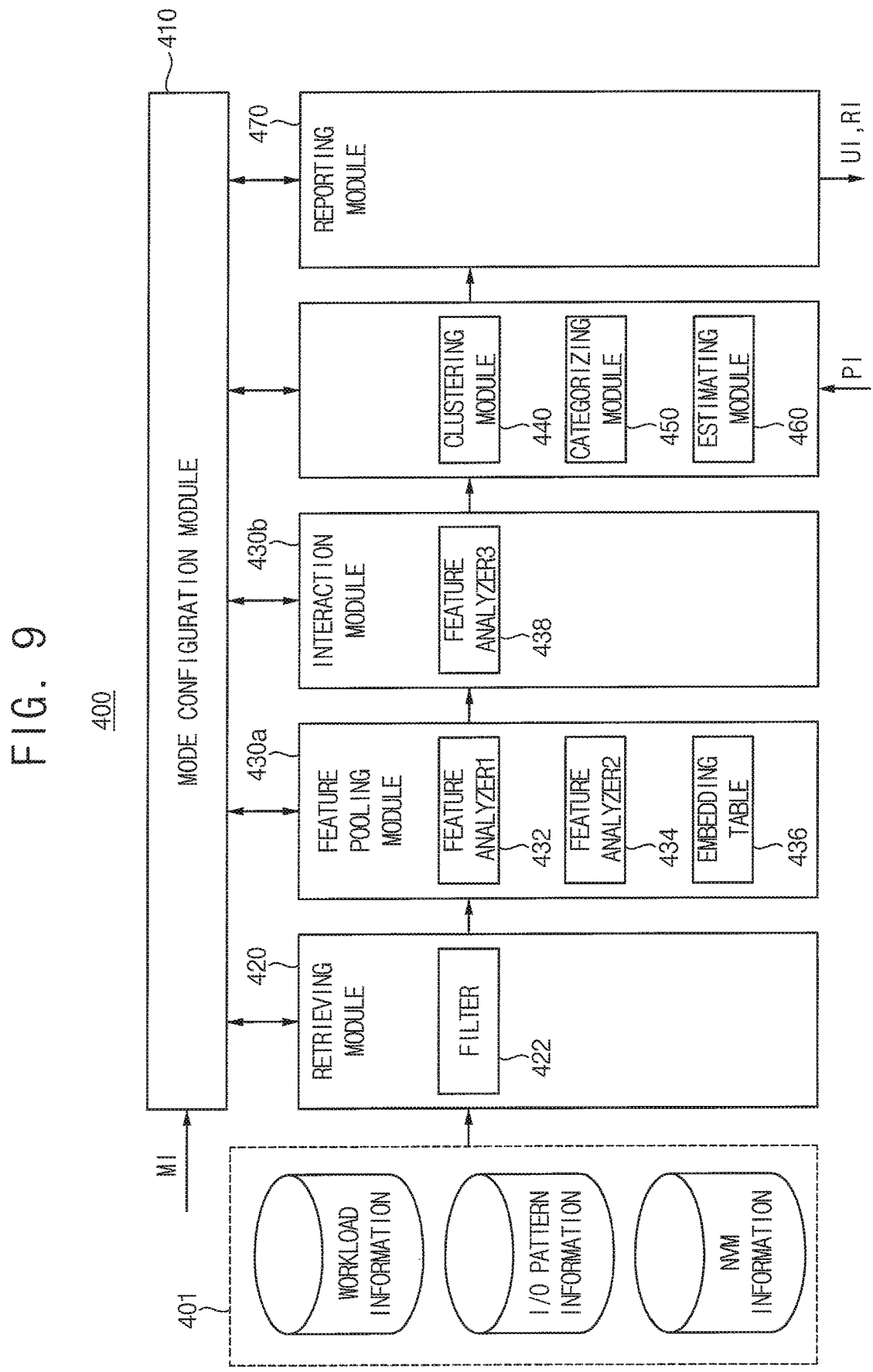
FIG. 9 is a block diagram illustrating a machine learning model included in a computational storage device according to at least one embodiment.

FIG. 9 is a block diagram illustrating an example of a machine learning engine included in a computational storage device according to at least one embodiment.

Referring to FIG. 9, according to some aspects, a machine learning engine 400 includes a mode configuration module 410, a retrieving module 420, first and second feature analyzing modules 430a and 430b, a clustering module 440, a categorizing module 450, and an estimating module 460. In some embodiments, the machine learning engine 400 includes a reporting module 470. According to some aspects, machine learning engine 400 is an example of, or includes aspects of, machine learning engine 315 as described with reference to FIGS. 1, 3-4, 5B, 6-7, and 8B-8D.

According to some aspects, each of the mode configuration module 410, the retrieving module 420, the first and second feature analyzing modules 430a and 430b, the clustering module 440, the categorizing module 450, the estimating module 460, and the reporting module 470 ("the modules") are implemented as a hardware circuit, in firmware, or as a software component. In some embodiments, at least one of the modules are implemented as a field programmable gate array (FPGA) or as an application specific integrated circuit (ASIC) configured to perform certain tasks. In some embodiments, at least one of the modules is configured to reside in a tangible addressable storage medium and execute on one or more processors. In some embodiments, at least one of the modules includes components such as software components, object-oriented software components, class components and task components, and processes, functions, routines, segments of program code, drivers, firmware, microcode, circuitry, data, databases, data structures, tables, arrays, and variables. In some embodiments, at least one of the modules is divided into a plurality of modules that perform detailed functions. According to some aspects, elements of the modules are likewise implemented as hardware circuits, in firmware, or as software components. In some embodiments, at least one of the modules is implemented as a neural network of varying architectures as described with reference to FIGS. 8B-8D.

According to some aspects, the machine learning engine 400 is interoperable with a database 401. In some embodiments, the database 401 is a storage space included in the computational storage device 300. In some embodiments, the database 401 includes the nonvolatile memories 320a, 320b, and 320c. in some embodiments, the database 401 further includes the buffer memory 330 and/or the storage controller 310.

According to some aspects, the mode configuration module 410 receives operation mode information MI. In some embodiments, the operation mode information MI includes information representing the range of data included in the database 401, the data to be analyzed, information for setting operation parameters of other modules, or the like. In some embodiments, the operation mode information MI is provided from the host device 200 or the firmware of the computational storage device 300. In some embodiments, the operation mode information MI is a user input.

According to some aspects, the retrieving module 420 receives a plurality of internal information from the database 401. For example, in at least one embodiment, the retrieving module 420 receives the plurality of internal information (e.g., the plurality of internal information IN_INFO as described with reference to FIG. 3) from the nonvolatile memories 320a, 320b, and 320c. In some embodiments, the retrieving module 420 includes a filter 422 that is configured to filter the plurality of internal information. In some embodiments, the filter 422 is implemented as a hardware circuit, in firmware, or as a software component.

In some embodiments, the plurality of internal information includes workload information associated with features (or characteristics) of the plurality of applications APP, input/output (I/O) pattern information associated with features of accessing the computational storage device 300 by the host device 200, and nonvolatile memory information associated with features of the nonvolatile memories 320a, 320b, and 320c.

In some embodiments, the workload information includes types of applications, patterns of inputs and parameters, lookups per embedding tables, the number of embedding tables, operators (e.g., string concatenation, sum, RNN, or the like), used embedding tables, vector data in embedding tables, used hardware implementations, or the like.

In some embodiments, the I/O pattern information includes read-intensive I/Os, write-intensive I/Os, data-hotness-degree I/Os, sequential-write I/Os, random-write I/Os, or the like.

In some embodiments, the nonvolatile memory information includes erase counts, bad blocks, bit error rate (BER), ECC states, operating temperature, write amplification (WA), wear-out states, corollary latency, program/erase (P/E) cycles, or the like.

According to some aspects, the first and second feature analyzing modules 430a and 430b perform an analyzing operation on the plurality of internal information based on a plurality of embedding tables 436. In some embodiments, the plurality of embedding tables 436 are similar to the plurality of embedding tables ETABLE. In some embodiments, the plurality of embedding tables 436 are an example of or include aspects of the plurality of embedding tables ETABLE described with reference to FIGS. 1-3 and 5B-7. The first feature analyzing module 430a may be referred to as a feature pooling module, and the second feature analyzing module 430b may be referred to as an interaction module.

According to some aspects, the first and second feature analyzing modules 430a and 430b include a first feature analyzer 432, a second feature analyzer 434, and a third feature analyzer 438. In some embodiments, the first feature analyzing module 430a includes the first feature analyzer 432 and the second feature analyzer 434, and the second feature analyzing module 430b includes the third feature analyzer 438.

According to some aspects, the first feature analyzer 432 performs a first feature analyzing operation without using the plurality of embedding tables 436. According to some aspects, the second feature analyzer 434 performs a second feature analyzing operation using the plurality of embedding tables 436. According to some aspects, the third feature analyzer 438 performs a third feature analyzing operation based on a result of the first feature analyzing operation and a result of the second feature analyzing operation.

According to some aspects, the clustering module 440 classifies at least some of the plurality of internal information into a first cluster and a second cluster by performing a clustering operation based on a result of the analyzing operations performed on the plurality of internal information. In some embodiments, the clustering module 440 selects an optimal clustering value by calculating the lowest similarity value between clusters.

According to some aspects, the categorizing module 450 receives a plurality of pattern information PI, selects a first reference value and a second reference value from the first cluster and the second cluster, respectively, based on a result of the clustering operation and the plurality of pattern information PI, and categorizes at least some of the plurality of internal information into a first reference group and a second reference group based on the first reference value and the second reference value.

According to some aspects, the estimating module 460 performs an estimating operation for analyzing the plurality of pattern information PI using the first reference group and the second reference group.

According to some aspects, the reporting module 470 generates update information UI for updating the plurality of internal information based on a result of the estimating operation. In some embodiments, the reporting module 470 provides the update information UI to the database 401, and is the update information UI is used for optimization. In some embodiments, the reporting module 470 generates report information RI for providing the firmware of the computational storage device 300 or for directly setting the computational storage device 300.

According to some aspects, at least some elements of the machine learning engine 400 are implemented as hardware. For example, in at least one embodiment, at least some elements of the machine learning engine 400 are included in a computer-based electronic system. According to some aspects, at least some elements of the machine learning engine 400 are implemented as instruction codes or program routines (e.g., software programs). For example, in at least one embodiment, the instruction codes or the program routines are executed by a computer-based electronic system, and are stored in any storage device located inside or outside the computer-based electronic system.

Figure 10:
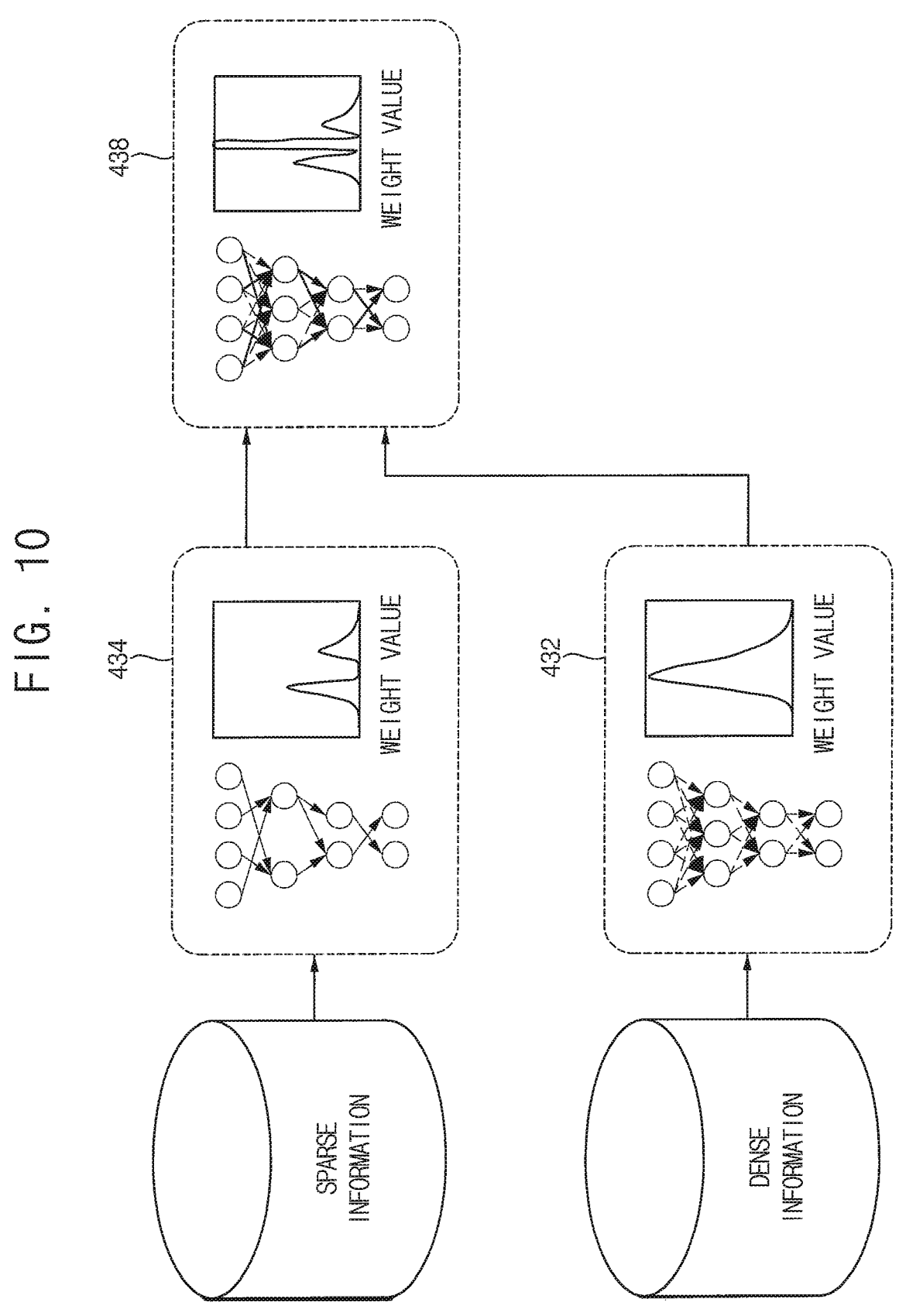
FIG. 10 is a diagram for describing an operation of a feature analyzing module included in a machine learning model of FIG. 9.

FIG. 10 is a diagram for describing an operation of a feature analyzing module included in a machine learning model of FIG. 9.

Referring to FIG. 10, according to some aspects, the first feature analyzer 432 performs the first feature analyzing operation based on dense inputs. In some embodiments, the I/O pattern information and the nonvolatile memory information correspond to the dense inputs. The first feature analyzer 432 and the first feature analyzing operation performed by the first feature analyzer 432 may be referred to as a dense feature analyzer and a dense feature analyzing operation, respectively.

According to some aspects, the second feature analyzer 434 performs the second feature analyzing operation based on sparse inputs. In some embodiments, the workload information corresponds to the sparse inputs. The second feature analyzer 434 and the second feature analyzing operation performed by the second feature analyzer 434 may be referred to as a sparse feature analyzer and a sparse feature analyzing operation, respectively.

According to some aspects, the third feature analyzer 438 performs the third feature analyzing operation by combining two dense vectors that are results of the first and second feature analyzing operations. The third feature analyzer 438 and the third feature analyzing operation performed by the third feature analyzer 438 may be referred to as a re-dense feature analyzer and a dense feature analyzing operation, respectively.

Figure 11:
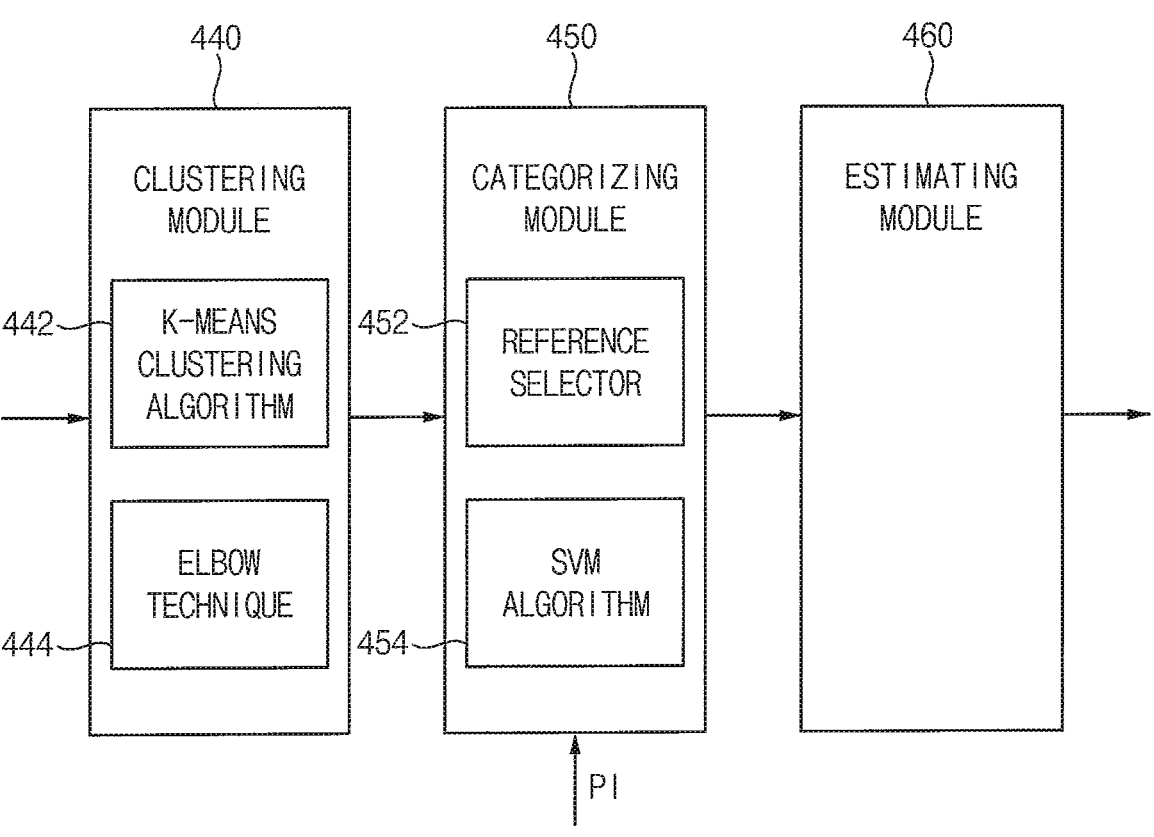
FIG. 11 is a block diagram illustrating a clustering module, a categorizing module, and an estimating module included in a machine learning engine of FIG. 9.
Figures 12A, 12B:
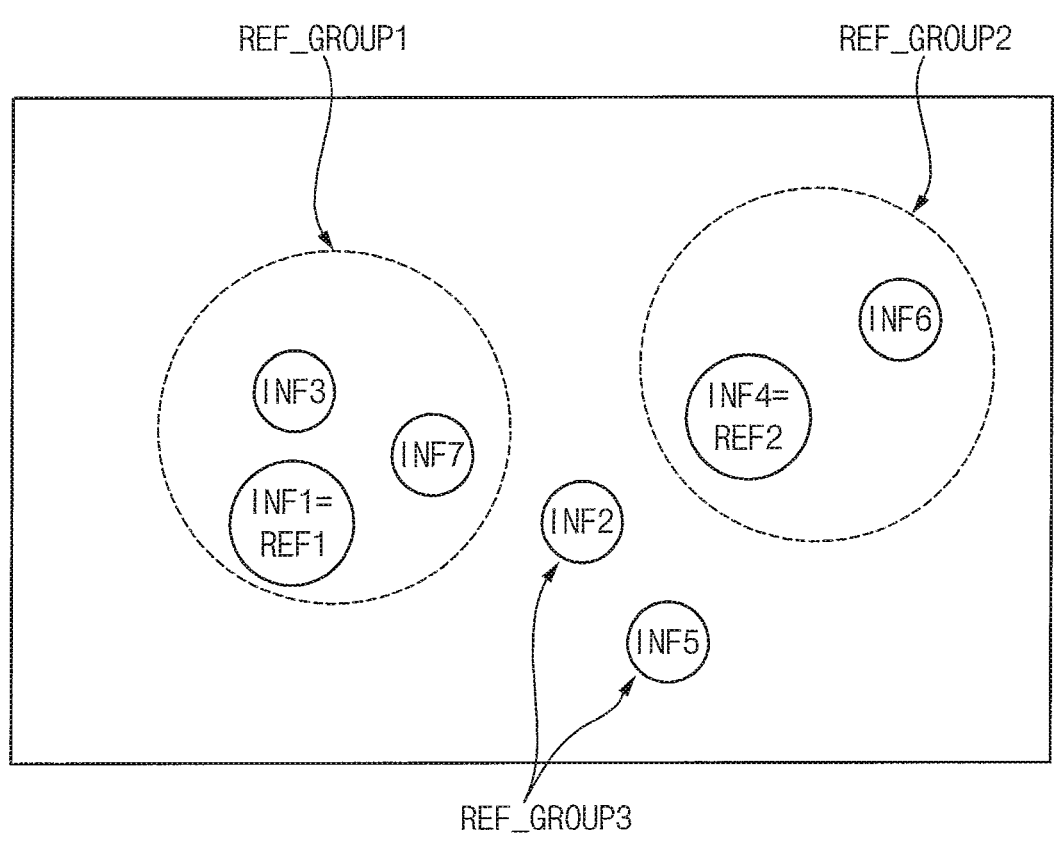
FIGS. 12A and 12B are diagrams for describing an operation of a clustering module and a categorizing module in FIG. 11.

FIG. 11 is a block diagram illustrating an example of a clustering module, a categorizing module, and an estimating module included in a machine learning engine of FIG. 9. FIGS. 12A and 12B are diagrams for describing an operation of a clustering module and a categorizing module in FIG. 11.

Referring to FIGS. 11, 12A, and 12B, according to some aspects, the clustering module 440 classifies at least some of the plurality of internal information into the first cluster and the second cluster by performing a k-means clustering operation based on a k-means clustering algorithm 442. In some embodiments, the clustering module 440 determines an optimal clustering value representing an optimal quantity or number of clusters by using an elbow technique 444.

According to some aspects, k-means clustering is a method of vector quantization, originally from signal processing, that aims to partition N observations into k clusters, where each observation belongs to a cluster with the nearest mean to the cluster (i.e., a cluster center or cluster centroid), serving as a prototype of the cluster. This operation results in a partitioning of the data space into Voronoi cells. In some embodiments, clustering module 440 performs the k-means clustering operation according to the following:

$$V = \sum_{i=1}^{k} \sum_{x_j \in S_i} |x_j - \mu_i|^2 \tag{1}$$

In some embodiments, a k value in the k-means clustering algorithm 442 is manually specified. However, in some embodiments, the k value differs from the actual quantity of clusters, and therefore, the clustering module 440 derives an optimal k value (e.g., an optimal clustering value or the optimal quantity of clusters) by excluding a k-mean with the lowest similarity based on the elbow technique 444 and then performing the k-means clustering operation again. For example, the clustering module 440 obtains a similarity score according to:

$$similarity = \cos(\theta) = \frac{A \cdot B}{\|A\| \, \|B\|} = \frac{\sum_{i=1}^{n} A_i B_i}{\sqrt{\sum_{i=1}^{n} A_i^2} \sqrt{\sum_{i=1}^{n} B_i^2}} \tag{2}$$

In an example illustrated in FIGS. 12A and 12B, the clustering module 440 performs the k-means clustering operation on internal information INF1, INF2, INF3, INF4, INF5, INF6 and INF7. In this example, the internal information INF1, INF2, and INF3 is set as the first cluster and the internal information INF4, INF5, and INF6 is set as the second cluster as a result of the k-means clustering operation.

According to some aspects, the categorizing module 450 selects internal information having the largest k-mean among internal information included in the first cluster as the first reference value, and selects internal information having the largest k-mean among internal information included in the second cluster as the second reference value using a reference selector 452. In some embodiments, the categorizing module 450 categorizes at least some of the plurality of internal information into the first reference group and the second reference group, and categorizes remaining internal information other than the first and second clusters among the plurality of internal information into a third reference group by performing a support vector machine (SVM) operation based on a SVM algorithm 454. For example, in at least one embodiment, the categorizing module 450 performs the SVM operation on the internal information included in the first cluster and the internal information included in the second cluster based on the first reference value and the second reference value.

In the machine learning context, support vector machines (SVMs, also support vector networks) are supervised learning models with associated learning algorithms that analyze data for classification and regression analysis. SVMs are one of the most robust prediction methods, being based on statistical learning frameworks or Vapnik-Chervonenkis (VC) theory. Given a set of training examples, each marked as belonging to one of two categories, an SVM training algorithm builds a model that assigns new examples to one category or the other, making it a non-probabilistic binary linear classifier. According to some aspects, the SVM algorithm 454 maps training examples to points in space so as to maximize the width of the gap between the two categories. In some embodiments, the categorizing module 450 maps new examples into that same space and predicts a category they belong to based on which side of the gap they fall on.

In an example illustrated in FIGS. 12A and 12B, the categorizing module 450 selects the internal information INF1 having the largest k-mean in the first cluster as a first reference value REF1, and selects the internal information INF4 having the largest k-mean in the second cluster as the second reference value REF2. The categorizing module may then perform an SVM operation. As a result, the machine learning model may set a first reference group REF_GROUP1 including the internal information INF1, INF3, and INF7 based on the first reference value REF1, and may set a second reference group REF_GROUP2 including the internal information INF4 and INF6 may based on the second reference value REF2. In addition, the machine learning model may set internal information INF2 and INF5 that are not included in the first and second reference groups REF_GROUP1 and REF_GROUP2 as a third reference group REF_GROUP3. The first and second reference groups REF_GROUP1 and REF_GROUP2 may be referred to as mapped groups, and the third reference group REF_GROUP3 may be referred to as an unmapped group.

According to some aspects, the estimating module 460 performs the estimating operation using the first and second reference groups REF_GROUP1 and REF_GROUP2, or using the first, second, and third reference groups REF_GROUP1, REF_GROUP2, and REF_GROUP3.

As described above, the machine learning model may perform the clustering optimization and the cluster matching (or mapping) using patterns and extracting the reference information, and then may perform additional clustering for unmatched results (e.g., discovering new patterns).

Although some embodiments are described based on two clusters and two mapped groups, embodiments of the present disclosure are not limited thereto, and according to some embodiments, three or more clusters and three or more mapped groups may be applied. For example, in at least one embodiment, the clustering module 440 further classifies remaining internal information other than the first and second clusters among the plurality of internal information into a third cluster (that is, the clustering module 440 classifies remaining information of the plurality of internal information that is not classified into the first and second clusters into a third cluster), the categorizing module 450 further selects a third reference value from the third cluster, and further categorizes the remaining internal information into a third reference group based on the third reference value, and the estimating module 460 further performs the estimating operation using the first, second, and third reference groups.

According to some aspects, a computational storage device determines the management scheme of the at least one of the plurality of embedding tables ETABLE and the plurality of applications APP based on the configuration and operation of the machine learning engine 400 described above. For example, in some embodiments, a specific embedding table that is a target of the table tiering management as described with reference to FIG. 4 may be determined, specific vector data that is a target of the buffering management as described with reference to FIGS. 5A and 5B may be determined, and/or a specific application that is a target of the hardware management as described with reference to FIG. 6 may be determined.

According to some aspects, the machine learning engine 400 is used not only for the operation of determining the management scheme, but also for the operation of supporting the execution of the DLRS. For example, in at least one embodiment, all components of the machine learning engine 400 are activated while determining the management scheme, and only the feature analyzing modules 430a and 430b are activated while supporting the execution of the DLRS.

Figure 13:
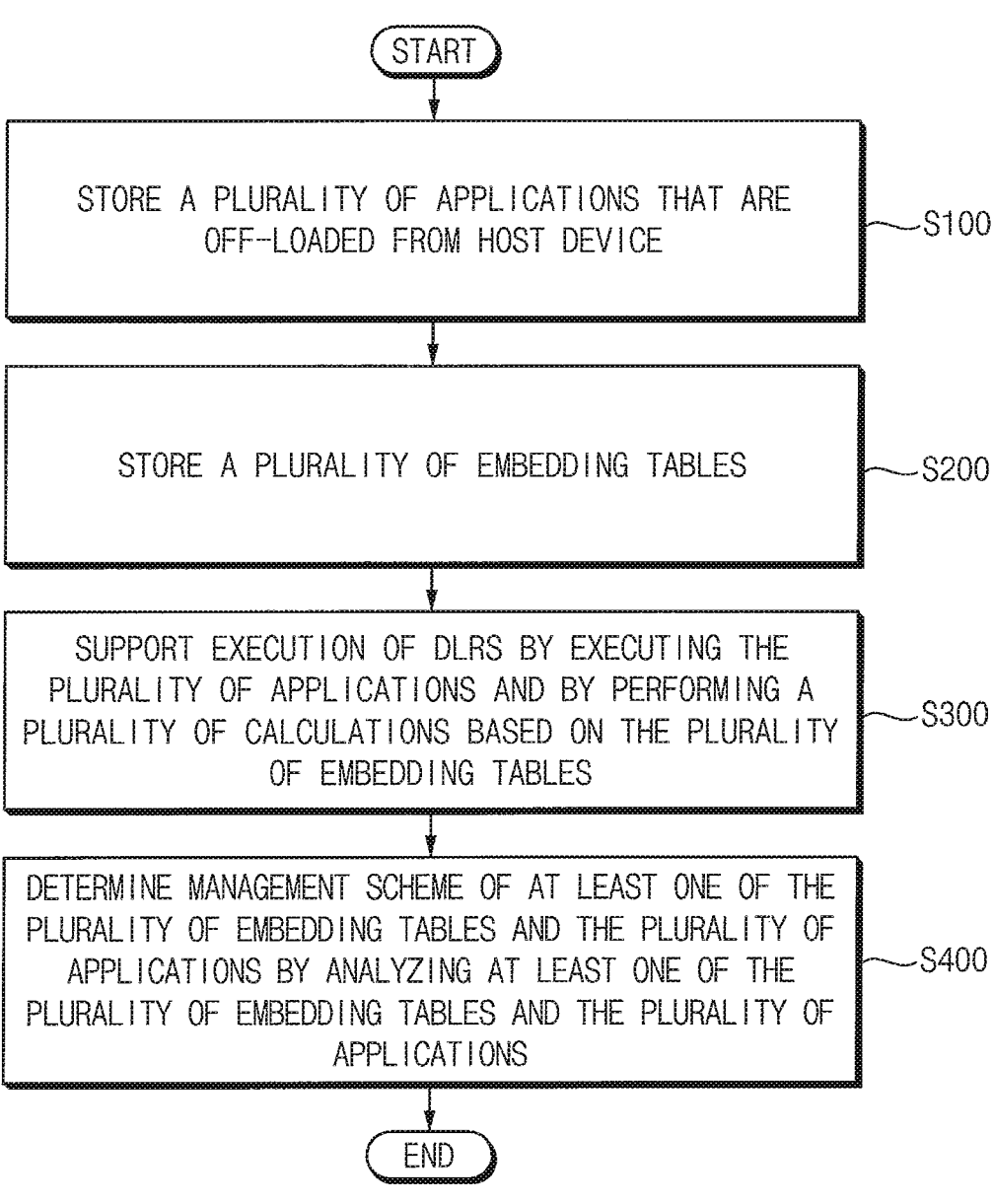
FIG. 13 is a flowchart illustrating a process of operating a computational storage device according to at least one embodiment.

FIG. 13 is a flowchart illustrating a process of operating a computational storage device according to at least one embodiment.

Referring to FIGS. 1 and 13, in step S100, the plurality of applications APP that are off-loaded from the host device 200 executing the DLRS are stored. In at least one embodiment, step S100 is performed by a nonvolatile memory and/or a storage controller as described with reference to FIG. 1. In step S200, the plurality of embedding tables ETABLE that are used in the DLRS are stored. In at least one embodiment, step S200 is performed by a nonvolatile memory as described with reference to FIG. 1. In an example, the plurality of applications APP are stored in the storage controller 310 and/or the nonvolatile memories 320a, 320b, and 320c, and the plurality of embedding tables ETABLE are stored in the nonvolatile memories 320a, 320b, and 320c.

In step S300, the execution of the DLRS is supported by executing the plurality of applications APP and by performing the plurality of calculations based on the plurality of embedding tables ETABLE. In at least one embodiment, step S300 is performed by any element that performs processing and is included in the computational storage device 300 as described with reference to FIG. 1 (e.g., the machine learning engine 315). In at least one embodiment, step S300 is performed by the machine learning engine 400 as described with reference to FIG. 9.

In step S400, the management scheme of the at least one of the plurality of embedding tables ETABLE and the plurality of applications APP is determined by analyzing the at least one of the plurality of embedding tables ETABLE and the plurality of applications APP. In at least one embodiment, step S400 is performed by the machine learning engine 315 and/or the machine learning engine 400.

FIGS. 14, 15, 16, and 17 are flowcharts illustrating operations of determining a management scheme in FIG. 13. In at least one embodiment, each step described with reference to FIGS. 14, 15, 16, and 17 is performed by the machine learning engine 315 as described with reference to FIGS. 1-8D and/or the machine learning engine 400 as described with reference to FIG. 9.

Referring to FIGS. 4, 13, and 14, in step S4111, when determining the management scheme in step S400, the usage of the plurality of embedding tables ETABLE_1 to ETABLE_M by the plurality of applications APP_1 to APP_N is analyzed. In step S413, based on the result of analyzing the usage of the plurality of embedding tables ETABLE_1 to ETABLE_M, the plurality of embedding tables ETABLE_1 to ETABLE_M are classified into first embedding tables (e.g., the embedding table ETABLE_1) and second embedding tables (e.g., the embedding tables ETABLE_2 to ETABLE_M). The number of times of the usage of the first embedding tables may be greater than a reference number of times (e.g., a reference usage number), and the number of times of the usage of the second embedding tables may be less than or equal to the reference number of times. For example, in at least one embodiment, the machine learning engine classifies an embedding table as a first embedding table if it is used or accessed more times than the reference usage number, and classifies the embedding table as a second embedding table if it is used fewer times than the reference usage number. According to some aspects, of the operations described with reference to FIG. 14 are performed according to the table tiering management operations described with reference to FIG. 4.

Referring to FIGS. 5A, 5B, 13, and 15, in step S421, when determining the management scheme in step S400, the usage of the plurality of vector data VDATA_1 to VDATA_K included in the plurality of embedding tables ETABLE_1 to ETABLE_M is analyzed. In step S423, based on the result of analyzing the usage of the plurality of vector data VDATA_1 to VDATA_K, at least one of the plurality of vector data VDATA_1 to VDATA_K is detected, and the detected vector data is temporarily stored in the buffer memory 331 and used by loading from the buffer memory 331. For example, in at least one embodiment, the machine learning engine detects vector data whose number of times of usage (or access) is greater than a reference vector data usage. According to some aspects, of the operations described with reference to FIG. 15 are performed according to the buffering management operations described with reference to FIGS. 5A and 5B.

Figure 16:
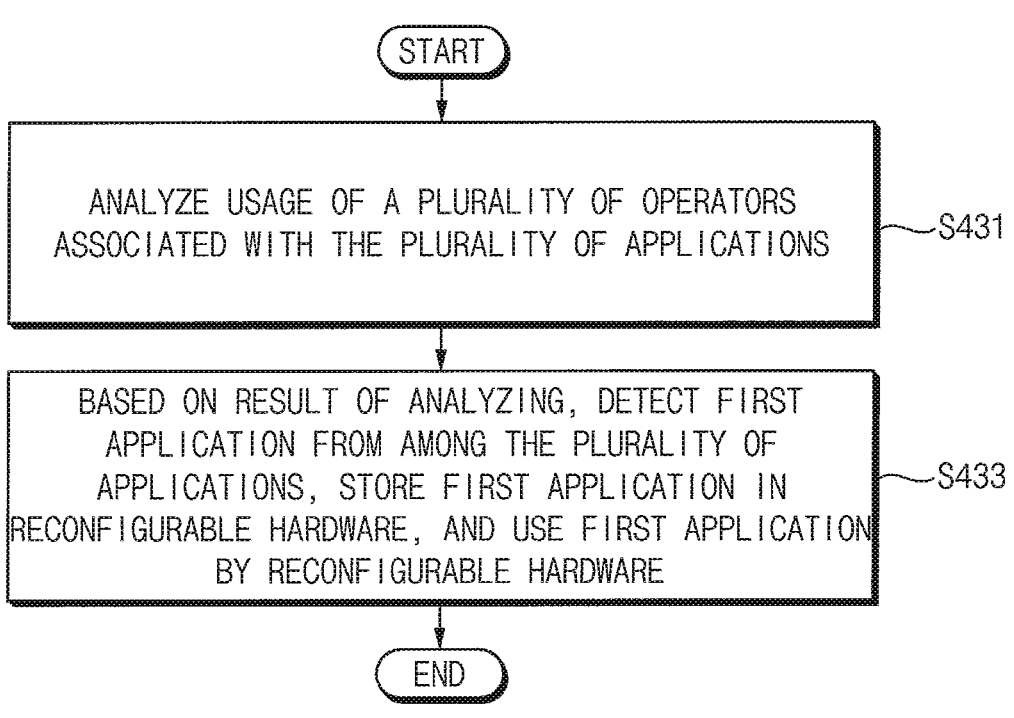

Referring to FIGS. 6, 13, and 16, in step S431, when determining the management scheme in step S400, the usage of the plurality of operators associated with the plurality of applications APP_1 to APP_N is analyzed. In step S433, based on the result of analyzing the usage of the plurality of operators, at least one of the plurality of applications APP_1 to APP_N is detected, and the detected application is stored in the reconfigurable hardware 360 and used by the reconfigurable hardware 360. For example, in at least one embodiment, the machine learning engine detects an application by comparing usage of the application with a reference application usage and determining that the application has been used more often than the reference application usage. According to some aspects, of the operations described with reference to FIG. 16 are performed according to the hardware management operations described with reference to FIG. 6.

Figure 17:
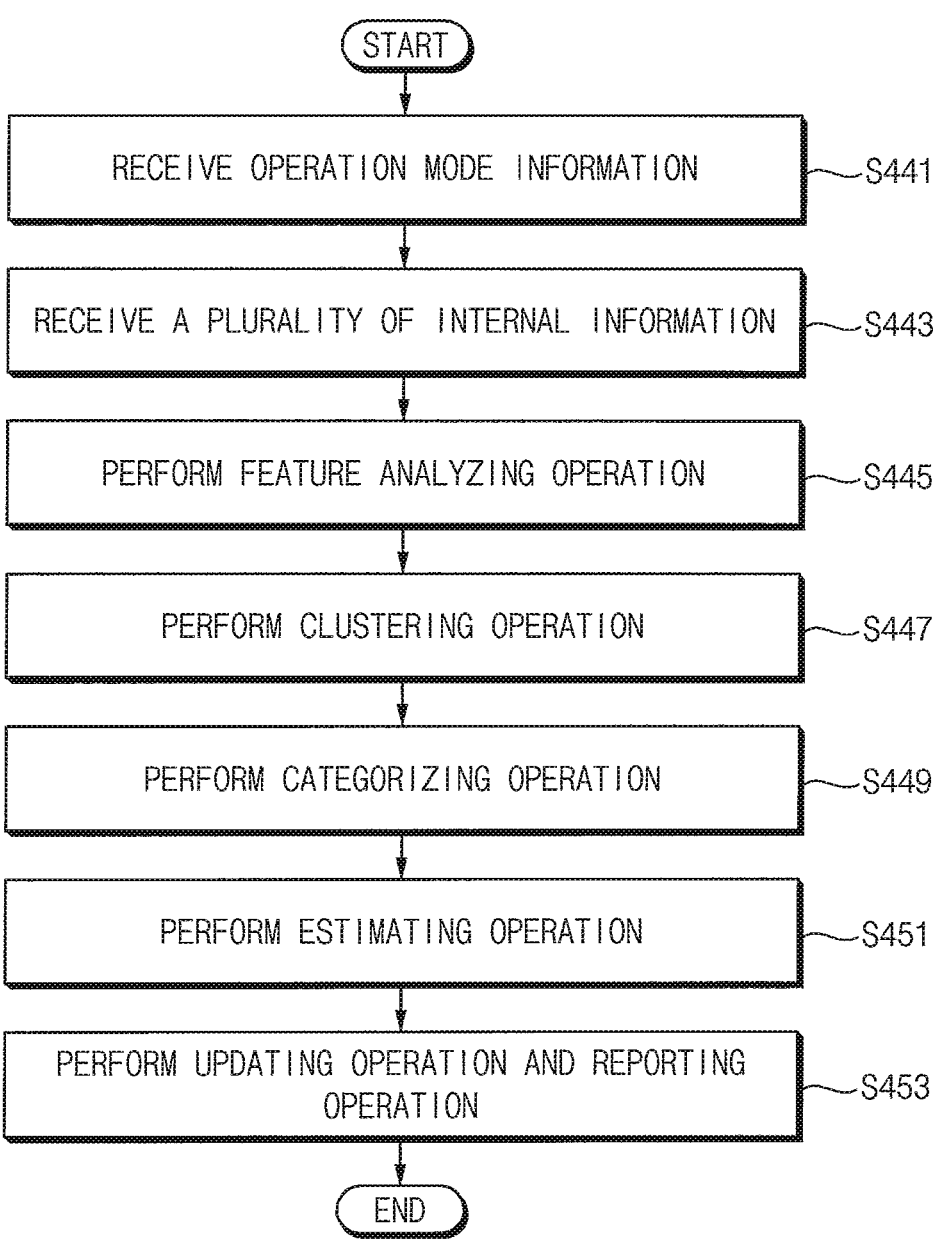

Referring to FIGS. 9, 13, and 17, in step S441, when determining the management scheme in step S400, the operation mode information MI is received. In step S443, the plurality of internal information is received from the database 401. In step S445, the feature analyzing operation is performed. In step S447, the clustering operation is performed. In step S449, the categorizing operation is performed. In step S451, the estimating operation is performed. According to some aspects, steps S441, S443, S445, S447, S449, and S451 are performed by the machine learning engine 315 and/or the machine learning engine 400 described with reference to FIG. 9. In at least one embodiment, steps S441, S443, S445, S447, S449, and S451 are performed as described with reference to FIGS. 10-12. In at least one embodiment, the management scheme described with reference to FIGS. 14, 15, and 16 is determined based on the result of the estimating operation of step S451. In step S453, after the management scheme is determined, the updating operation and the reporting operation based on the result of the estimating operation is performed.

As will be appreciated by those skilled in the art, embodiments of the inventive concept may be implemented as a system, method, computer program product, and/or a computer program product implemented in one or more computer readable medium(s) having computer readable program code stored thereon. The computer readable program code may be provided to a processor of a general purpose computer, special purpose computer, or other programmable data processing apparatus. The computer readable medium may be a non-transitory computer readable storage medium. The non-transitory computer readable storage medium may be any tangible medium that can contain or store a program for use by or in connection with an instruction execution system, apparatus, or device.

Embodiments of the inventive concept may be applied to various electronic devices and systems that include storage devices and storage systems. For example, embodiments of the inventive concept may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

While the inventive concept has been particularly shown and described with reference to embodiments thereof, it will be understood that various changes in form and details may be made therein without departing from the spirit and scope of the present disclosure.

What is claimed is:

1. A computational storage device comprising:
a nonvolatile memory configured to store a plurality of embedding tables for a deep-learning recommendation system (DLRS); and
a storage controller configured to:
control an operation of the nonvolatile memory;
store a plurality of applications that are off-loaded from a host device executing the DLRS; and
support an execution of the DLRS by executing the plurality of applications and performing a plurality of calculations based on the plurality of embedding tables,
wherein the storage controller includes a machine learning engine configured to determine a management scheme of at least one embedding table of the plurality of embedding tables and the plurality of applications by analyzing the at least one embedding table and the plurality of applications, and wherein the machine learning engine is further configured to perform an analysis of usage of the at least one embedding table by determining a number of times the at least one embedding table is used.

2. The computational storage device of claim 1, wherein the machine learning engine is further configured to:

classify the at least one embedding table as a first embedding table or a second embedding table based on the analysis and a reference usage number.

3. The computational storage device of claim 2, wherein the nonvolatile memory includes:

a first block including single-level memory cells (SLCs), each SLC storing one data bit; and a second block including multi-level memory cells (MLCs), each MLC storing two or more data bits, and wherein first embedding tables are stored in the first block and second embedding tables are stored in the second block.

4. The computational storage device of claim 1, further comprising a buffer memory configured to temporarily store data stored in or to be stored in the nonvolatile memory, wherein the machine learning engine is configured to:

analyze usage of a plurality of vector data included in the plurality of embedding tables;

detect first vector data from among the plurality of vector data based on a result of analyzing the usage of the plurality of vector data; and temporarily store the first vector data in the buffer memory, and wherein the first vector data is used by loading from the buffer memory.

5. The computational storage device of claim 1, further comprising a reconfigurable hardware configured to store and execute at least one of the plurality of applications, wherein the machine learning engine is configured to:

analyze usage of a plurality of operators associated with the plurality of applications;

detect a first application from among the plurality of applications; and store the first application in the reconfigurable hardware, and wherein the first application is used by the reconfigurable hardware.

6. The computational storage device of claim 5, wherein the reconfigurable hardware is disposed inside the storage controller.

7. The computational storage device of claim 5, wherein the reconfigurable hardware is disposed outside the storage controller.

8. The computational storage device of claim 1, wherein the machine learning engine includes:

a mode configuration module configured to receive operation mode information;

a retrieving module configured to receive a plurality of internal information from the nonvolatile memory;

a feature analyzing module configured to perform an analyzing operation on the plurality of internal information based on the plurality of embedding tables;

a clustering module configured to classify at least some of the plurality of internal information into a first cluster and a second cluster by performing a clustering operation based on a result of the analyzing an operation on the plurality of internal information;

a categorizing module configured to:

receive a plurality of pattern information, select a first reference value and a second reference value from the first cluster and the second cluster, respectively, based on a result of the clustering operation and the plurality of pattern information, and categorize the at least some of the plurality of internal information into a first reference group and a second reference group based on the first reference value and the second reference value; and an estimating module configured to perform an estimating operation for analyzing the plurality of pattern information using the first reference group and the second reference group, wherein the clustering module is configured to select an optimal clustering value by calculating a lowest similarity value between clusters.

9. The computational storage device of claim 8, wherein:

the clustering module is further configured to classify remaining information of the plurality of internal information that is not classified into the first and second clusters into a third cluster;

the categorizing module is further configured to select a third reference value from the third cluster and categorize the remaining information into a third reference group based on the third reference value; and the estimating module is further configured to perform the estimating operation using the first, second, and third reference groups.

10. The computational storage device of claim 8, wherein the clustering module is further configured to:

classify the at least some of the plurality of internal information into the first cluster and the second cluster by performing a k-means clustering operation; and determine the optimal clustering value representing an optimal quantity of clusters using an elbow technique.

11. The computational storage device of claim 10, wherein the categorizing module is configured to:

select internal information having a largest k-mean among internal information included in the first cluster as the first reference value;

select internal information having a largest k-mean among internal information included in the second cluster as the second reference value; and categorize the at least some of the plurality of internal information into the first reference group and the second reference group by performing a support vector machine (SVM) operation on the internal information included in the first cluster and the internal information included in the second cluster based on the first reference value and the second reference value.

12. The computational storage device of claim 8, wherein the plurality of internal information include workload information associated with features of the plurality of applications, input/output (I/O) pattern information associated with features of accessing the computational storage device by the host device, and nonvolatile memory information associated with features of the nonvolatile memory.

13. The computational storage device of claim 8, wherein the feature analyzing module includes:

a first feature analyzer configured to perform a first feature analyzing operation without the plurality of embedding tables;

a second feature analyzer configured to perform a second feature analyzing operation using the plurality of embedding tables; and a third feature analyzer configured to perform a third feature analyzing operation based on a result of the first feature analyzing operation and a result of the second feature analyzing operation.

14. The computational storage device of claim 8, wherein the machine learning engine further includes a reporting module configured to update the plurality of internal information based on a result of the estimating operation.

15. The computational storage device of claim 1, wherein the storage controller further includes:

a host interface configured to communicate with the host device; and a program slot configured to store the plurality of applications.

16. The computational storage device of claim 15, wherein the host interface is configured to operate based on a nonvolatile memory express (NVMe) technical proposal (TP) 4091 protocol.

17. The computational storage device of claim 15, further comprising a buffer memory configured to temporarily store data stored in or to be stored in the nonvolatile memory, and wherein the storage controller further includes a buffer manager configured to manage the buffer memory.

18. The computational storage device of claim 17, wherein the host interface is configured to operate based on compute express link (CXL) protocol.

19. A method of operating a computational storage device, the method comprising:

storing a plurality of applications that are off-loaded from a host device executing a deep-learning recommendation system (DLRS);

storing a plurality of embedding tables that are used in the DLRS;

supporting an execution of the DLRS by executing the plurality of applications and performing a plurality of calculations based on the plurality of embedding tables; and determining, by use of a machine learning engine, a management scheme of at least one of the plurality of embedding tables and the plurality of applications by analyzing the at least one of the plurality of embedding tables and the plurality of applications, wherein the machine learning engine is configured to perform an analysis of usage of the at least one embedding table by determining a number of times the at least one embedding table is used.

20. A computational storage device comprising:

a nonvolatile memory configured to store a plurality of embedding tables for a deep-learning recommendation system (DLRS);

a buffer memory configured to temporarily store data stored in or to be stored in the nonvolatile memory;

a storage controller configured to:

control an operation of the nonvolatile memory, store a plurality of applications that are off-loaded from a host device executing the DLRS, and support an execution of the DLRS by executing the plurality of applications and performing a plurality of calculations based on the plurality of embedding tables; and a reconfigurable hardware configured to store and execute at least one of the plurality of applications, the reconfigurable hardware being disposed inside or outside the storage controller, wherein the storage controller includes a machine learning engine configured to:

analyze at least one of the plurality of embedding tables and the plurality of applications by performing a k-means clustering operation, a support vector machine (SVM) operation, and an estimating operation based on a plurality of internal information; and determine a management scheme of the at least one of the plurality of embedding tables and the plurality of applications based on a result of analyzing the at least one of the plurality of embedding tables and the plurality of applications, and wherein the machine learning engine is further configured to:

analyze usage of the plurality of embedding tables and classify the plurality of embedding tables into first embedding tables stored in single-level memory cells (SLCs) and second embedding tables stored in multi-level memory cells (MLCs), or analyze usage of a plurality of vector data included in the plurality of embedding tables, temporarily store at least one of the plurality of vector data in the buffer memory, and use the at least one of the plurality of vector data stored in the buffer memory, or analyze usage of a plurality of operators associated with the plurality of applications, store at least one of the plurality of applications in the reconfigurable hardware, and use the at least one of the plurality of applications stored in the reconfigurable hardware.

* * * * *